United States Patent
Woodard et al.

(10) Patent No.: US 7,032,011 B2
(45) Date of Patent: *Apr. 18, 2006

(54) SERVER BASED EXTRACTION, TRANSFER, STORAGE AND PROCESSING OF REMOTE SETTINGS, FILES AND DATA

(75) Inventors: Andrew Shay Woodard, Raleigh, NC (US); Gerard D. Lynch, Newburyport, MA (US); Dana Bruce Berenson, Bradford, MA (US)

(73) Assignee: Symantec Corporation, Cupertino, CA (US)

( * ) Notice: Subject to any disclaimer, the term of this patent is extended or adjusted under 35 U.S.C. 154(b) by 789 days.

This patent is subject to a terminal disclaimer.

(21) Appl. No.: 09/852,011

(22) Filed: May 10, 2001

(65) Prior Publication Data

US 2002/0104080 A1    Aug. 1, 2002

Related U.S. Application Data

(63) Continuation-in-part of application No. 09/709,505, filed on Nov. 13, 2000.

(60) Provisional application No. 60/192,860, filed on Mar. 29, 2000.

(51) Int. Cl.
*G06F 15/177* (2006.01)

(52) U.S. Cl. .............. 709/220; 713/1; 713/100

(58) Field of Classification Search ........... 370/351; 709/217, 203; 713/1, 100
See application file for complete search history.

(56) References Cited

U.S. PATENT DOCUMENTS

| 5,845,282 A | 12/1998 | Alley et al. ............. 707/10 |
|---|---|---|
| 5,872,966 A | 2/1999 | Burg ..................... 395/651 |
| 5,996,012 A | 11/1999 | Jarriel ................... 709/226 |
| 6,012,130 A | 1/2000 | Beyda et al. ............ 711/173 |
| 6,088,732 A | 7/2000 | Smith et al. ............ 709/229 |

(Continued)

FOREIGN PATENT DOCUMENTS

EP    1 173 809 B1    4/2003

OTHER PUBLICATIONS

Box et al., *Simple Object Access Protocol (SOAP) 1.1*, W3C Note May 8, 2000, pp. 1-32.

*Primary Examiner*—John Follansbee
*Assistant Examiner*—Dustin Nguyen
(74) *Attorney, Agent, or Firm*—Gunnison, McKay & Hodgson, L.L.P.; Serge J. Hodgson

(57) ABSTRACT

A network based solution is described associated with the extraction, transfer, storage, and processing of application settings, files and other data from a subscriber's source computer-based device to a server system, and the subsequent transfer of the application settings, files, and other data from the server system onto a target computer-based device. A server downloads a software module onto the user's computer-based device. A series of pre-stored instructions commensurate with selected settings, files and data are sent from a remote server to the software module to uncover, extract, collect, and return to allocated storage space of the server the sought information. Once the application settings, files and other data are stored within the remote server system, they can be retrieved by the subscriber for purposes of restoring a crashed system, transference to a repaired or new system, converted for use on a new differing device or updated to reflect changes in software. Furthermore, the present invention allows for future compatibility of formats, programs, platforms or device configurations based on periodic updating of the instruction scripts without any modifications to the downloaded software module.

30 Claims, 20 Drawing Sheets

U.S. PATENT DOCUMENTS

| | | | |
|---|---|---|---|
| 6,091,518 A | 7/2000 | Anabuki | 358/500 |
| 6,161,176 A | 12/2000 | Hunter et al. | 713/1 |
| 6,182,212 B1 | 1/2001 | Atkins et al. | 713/1 |
| 6,185,598 B1 | 2/2001 | Farber et al. | 709/200 |
| 6,202,206 B1 | 3/2001 | Dean et al. | 717/11 |
| 6,311,180 B1 | 10/2001 | Fogarty | 707/4 |
| 6,336,124 B1 | 1/2002 | Alam et al. | 707/523 |
| 6,370,646 B1 * | 4/2002 | Goodman et al. | 713/100 |
| 6,377,927 B1 | 4/2002 | Loghmani et al. | 704/275 |
| 6,477,565 B1 * | 11/2002 | Daswani et al. | 709/217 |
| 6,546,002 B1 * | 4/2003 | Kim | 370/351 |
| 6,556,217 B1 | 4/2003 | Makipaa et al. | 345/667 |
| 6,593,943 B1 | 7/2003 | MacPhail | 345/734 |
| 6,609,162 B1 | 8/2003 | Shimizu et al. | 710/15 |
| 6,654,814 B1 | 11/2003 | Britton et al. | 709/246 |
| 6,735,691 B1 * | 5/2004 | Capps et al. | 713/1 |
| 6,766,298 B1 | 7/2004 | Ravishankar et al. | 704/270.1 |
| 6,917,958 B1 * | 7/2005 | Howe et al. | 709/203 |
| 2002/0111972 A1 | 8/2002 | Lynch et al. | 707/523 |
| 2003/0159028 A1 | 8/2003 | Mackin et al. | 713/100 |

* cited by examiner

| CATALOG (bds_admin) |
|---|
| nUniqueID |
| vanID |
| nPID |
| sURI |
| sFullPath |
| nFlagsAndAttributes |
| nCreationTimeHi |
| nCreationTimeLo |
| nLastAccessTimeHi |
| nLastAccessTimeLo |
| nLastWriteTimeHi |
| nLastWriteTimeLo |
| nSizeHi |
| nSizeLo |

Figure 10

| VanApp (dbo) |
|---|
| ▶ PID |
| VanID |
| TypeID |
| Status |
| IncludeInLoad |
| IncludeInUnload |

Figure 13

| Snippet (dbo) |
|---|
| ▶ PID |
| Type |
| Category |
| Snippet |
| Status |

Figure 15

| Setting (dbo) |
|---|
| ▶ SettingID |
| VanID |
| CID |
| Data |
| SequenceNumber |
| Status |

Figure 18

```
<StoreFileAtValue>HKCU\Software\Microsoft\WAB\WAB4\Wab File Name\
<CID>20</CID> ———1906
</StoreFileAtValue>
```
1900

1910
1908

```
<StoreFileAtValue>HKCU\Software\Microsoft\WAB\WAB4\Wab File Name\
<CID>20</CID>
<Value>80596</Value> ———1904
</StoreFileAtValue>
```
1902

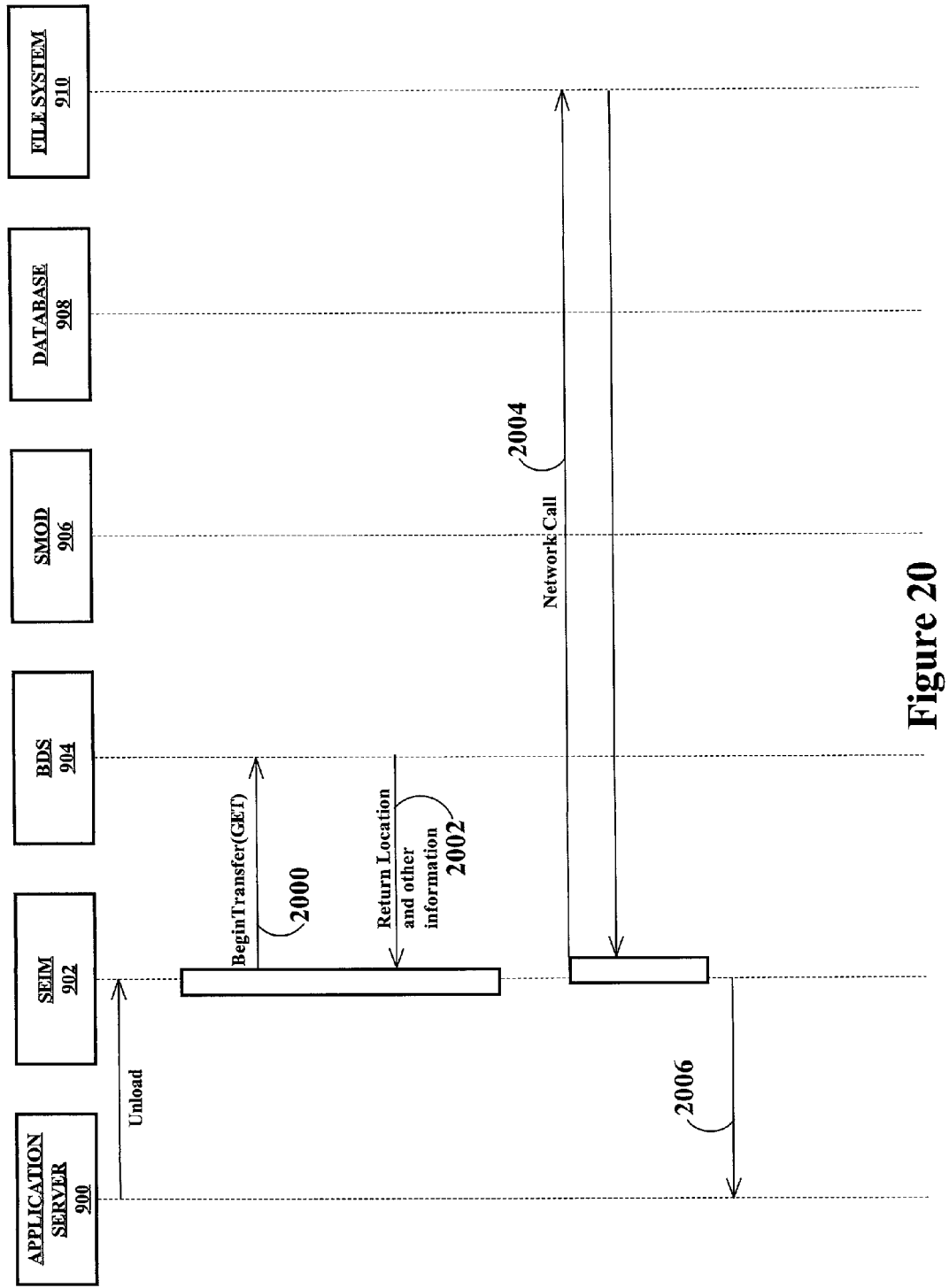

SERVER BASED EXTRACTION, TRANSFER, STORAGE AND PROCESSING OF REMOTE SETTINGS, FILES AND DATA

RELATED APPLICATIONS

The present application is a continuation-in-part of Application No. 09/709,505 entitled "System for Transporting Application Settings, Files, and Other Data from Once Computer-Based Device to Another Computer-Based Device", filed Nov. 13, 2000, currently pending, which claims the benefit of U.S. Provisional Application No. 60/192,860, entitled "Method and System for Transferring Application Settings, Filed, and Other Data from One Computer to Another Computer", filed Mar. 29, 2000.

The present application is related to co-pending application entitled "System and Method for Transferring Settings and Files Defining an Operating Environment utilizing a Software Module", assigned to the same assignee as the present application, which is incorporated herein by reference The present application is related to co-pending application entitled "Virtual Access", assigned to the same assignee as the present application, which is incorporated herein by reference.

BACKGROUND OF THE INVENTION

1. Field of Invention

The present invention relates generally to the field of remote acquisition/transfer and storage of computer files and settings associated with a computer-based device. More specifically, the present invention is related to a server system that facilitates the extraction of application settings, files and other data from a source computer-based device, intelligent remote storage and the subsequent transfer of the application settings, files, and other data from the server system to a target computer-based device.

2. Discussion of Prior Art

Computer users have long sought ways to improve the speed and ease of storing, customizing and transferring data and program files. Primary storage typically has been dedicated to a PC's hard drive or connected network storage. Recently, Internet storage of data for the purposes of backing-up files has become available. In each of these cases, a user selects files for storage and copies an instance of the file to the destination computer storage location. What the prior art has failed to provide for is a network-based method of extracting, not only specified data and program files for download and storage, but specific settings and user preferences associated with the files, such as a user's PC desktop settings, e.g. background design on the monitor (wallpaper), desktop settings or automatic start-up commands which are frequently customized.

Over time, individuals will normally store certain software applications and data on their PCs. These applications are typically customized to suit the individual user's particular preferences. For instance, with regard to a word processing application, the user may specify a preferred default font, a custom page layout, customized spell-checking dictionaries, and easy access to frequently retrieved files.

More recently, users have personalized their computer-based devices so that certain Internet features are stored for later use. For example, users normally customize their computer-based devices to allow easy dial-up access to their preferred Internet service provider or to save their favorite World Wide Web ("WWW") sites, e-mail addresses, browser bookmarks, etc. At the present time, a user must endure both the time and effort to customize every new device that they purchase. No method exists to easily enable the user to perform a selective direct extraction, transference and remote storage of the "look and feel" or content of existing devices. In addition, it would be useful to carry the user's configuration from device to device without requiring the user to reconfigure each time (i.e., customizing hardware and software settings, reloading software and files, etc.).

Prior art methods of file extraction are time consuming, technically demanding on the user and fail to allow conversion between differing devices, differing software, hardware, platforms, environments, communications standards, etc. Most consumer users, especially residential users, do not have the resources or the know how to undertake the transfer of the appropriate files and settings from one computer-based device to another in a quick and efficient manner. In the enterprise or industrial environment, introducing new computer-based devices or moving/upgrading existing ones becomes a burden because of compatibility, loss of data, and time issues.

What is needed is a server system which can provide a network-based, easy, fast and comprehensive method of extraction/transference of settings, software, and data, while considering modifications thereof based on compatibility, software programs, the selected receiving device, user selections and upgrading.

SUMMARY OF THE INVENTION

The present invention provides for a network-based solution associated with the extraction, transfer, storage and processing of application settings, files and other data from a source computer-based device, and the subsequent transfer of the application settings, files, and other data from the server system onto a target computer-based device. The preferred embodiment server system includes an application server, a binary data server, and a database server.

A user wishing to use the present system contacts the remote server system to secure storage space, payment terms and related security measures (i.e., ID and password). Once space is allocated to the new subscriber, the server system attempts to recognize the operating environment of at least a first computer-based device operated by said subscriber, the remote network server system downloads an XML based software module onto the first computer-based device. The software module will uncover this information with a series of instructions which are sent from a remote server to the software module providing a roadmap to uncover, extract, collect and return such to the allocated storage space of the connected server.

Once the operating environment is discovered, instructions specific to selected application settings, files and other data on the subscriber's computer-based device are communicated to the software module to uncover, extract, collect and return such to the allocated storage space of the connected server using a network communications path. In an enterprise environment, the remote servers may be retained within the enterprise's computing environment.

Once the application settings, files and other data are stored within the remote server system, they can be retrieved by the subscriber for purposes of restoring a crashed system, transference to a repaired or new system, converted for use on a new differing device or updated to reflect changes in software.

Furthermore, the server system of the present invention allows for future expansion and compatibility based on periodic updating of the instruction scripts without any modifications to the software module that is resident in the source computer-based system. Thus the system is dynamically modified to work with new and different systems, platforms, formats and programs without input from the subscriber. This differs greatly from prior art systems, which require users to download updated versions of the software modules/plug-ins for proper functionality.

BRIEF DESCRIPTION OF THE DRAWINGS

FIG. 10 illustrates the schema diagram of the catalog table.

FIG. 13 illustrates the UDS VanApp table.

FIG. 15 illustrates the CDS snippet table.

FIG. 18 illustrates the settings table.

FIG. 20 illustrates the steps performed during processing of the unload directive file.

DESCRIPTION OF THE PREFERRED EMBODIMENTS

Figure 1:
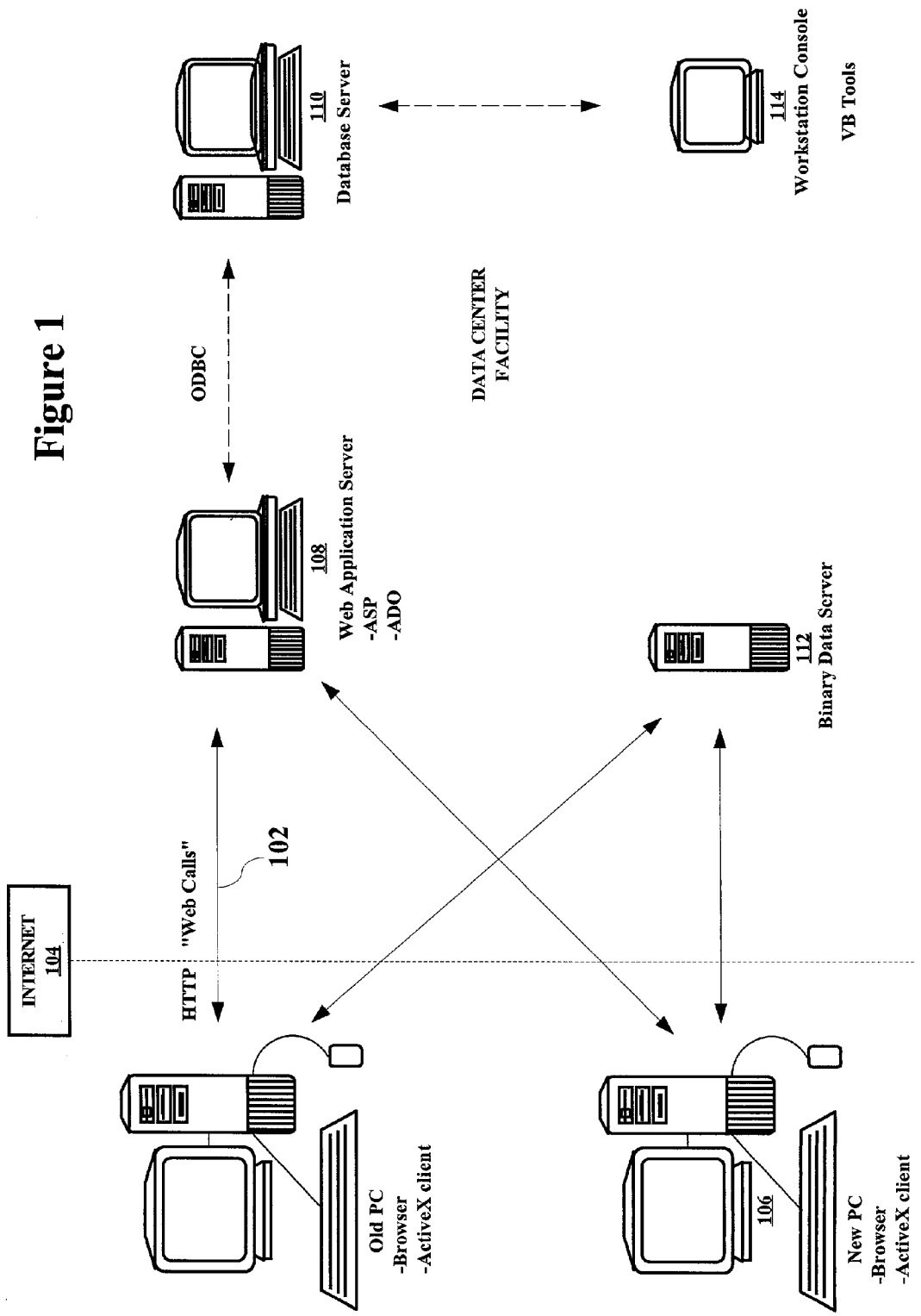
FIG. 1 illustrates the system associated with co-pending application entitled, "System for Transporting Application Settings, Files, and Other Data from One Computer-Based Device to Another Computer-Based Device".

While this invention is illustrated and described in a preferred embodiment, the invention may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

Definitions are provided to help with the general understanding of server activity during transfer of application settings, files, and other data, and are not meant to limit their interpretation or use thereof. Therefore, other known definitions or equivalents may be substituted without departing from the scope of the present invention. Throughout this document, the term 'Network' includes all current methods of data transfer between computer-based devices, including those currently implied by the term 'the Internet,' to include but not limited to HTTP, FTP, SSH, TCP/IP, socket connection, XML, XMI, wireless and telephony data transfer. Furthermore, throughout the specification the term CAD (client access DLL) has been replaced with SEIM (settings extraction/injection module). These terns are interchangeable.

Application Server—the user interface for the system. Components of the Application Server comprise: dynamic interface pages, hidden Dynamic Server Pages for application logic in "Network Calls." (Described below) Dynamic Server Pages (DSP) that drive the flow of the browser GUI, creating directive files for transmission to the client, decoding directive files from a client to store in the database.

Dynamic Server Page (DSP)—as is well known in the art, a specification for dynamically created pages for execution in a browser that utilizes client or server-side code, which enables network-based applications to be interactive. DSP pages are similar to CGI scripts, but the processing they perform is managed by code within the page, as opposed to code external to the page.

Settings Extraction/Injection Module (SEIM)—a software module downloaded to the client computer-based device whose main flnctions are to load and unload settings from user devices into an XML file. It interacts with the registry, settings files, file system, and the browser on the user device. It also interacts with the BDS (see below) and the SMOD (see below) via network calls.

BDS (Binary Data Server)—a series of dynamic server pages that interact with the server file system and the database. Its main function is to facilitate the storing and cataloging of user files. The BDS also contains a database of binary files of the system. The binary database serves the BDS and is preferably located on a separate computer-based device than the BDS; however, the binary database and binary data server are capable of being located on the same computer-based device. Binary files are stored separate from the other databases to provide efficient use of storage space and to provide greater storage scalability.

SMOD (Server Module)—a, module that runs on the Application Server to process the settings data that is stored in the database.

Database Server—one or more databases which store information such as a catalog of the files stored on the file system, the settings gathered from the user's computer-based device, and general information about the user. Database Server services requests from the Web Application Server, reporting systems, and system tools. Data models of the Database Server are: Accounts and user demographics: logins, passwords, names, e-mail addresses, last time system used, user profile, value of settings being integrated, etc., Application Settings Repository: known applications, settings of known applications, settings categories, application versions, conversion tables for settings, etc., Binary data catalog: name and location of user binary files on the binary data server.

File System—the actual file system where user binary data is stored.

Profile—environment of computer-based device including settings, data, files, etc.

Van—A Van is the term used to refer to a specific 'profile' (see above) that a user loads with the system. A Van may not comprise the entirety of a user environment or profile, but may, at the user's discretion, be comprised of different types of content. For example, a user may create a 'Home Van' for personal content and settings, and a 'Work Van' for work-related content and settings.

The co-pending application, entitled "System for Transporting Application Settings, Files, and Other Data from One Computer-Based Device to Another Computer-Based Device", describes a system for overcoming the above difficulties. In the system of the co-pending application a software module is transferred to computer-based devices in order to determine and facilitate the appropriate data transfer. As the software module and the application settings, files and other data are transferred between the computer-based devices over network communication links external to the devices, significant advantages are obtained when the software module itself, as well as communication messages between the module and the rest of the system, are as small as possible. Some advantages (e.g., decreased overall time of transferring operating environment) would be particularly noticeable to users of the system in which low-bandwidth communication links are utilized, such as when users are connected via modems. However, even if high-bandwidth communication links are used, conservation of bandwidth is a desirable quality in all systems. FIG. 1 illustrates the system associated with this co-pending application, wherein a software module facilitates the transfer of application settings, files, and other data between a first computer-based device 100, and a second computer-based device 106, via an application server 108. In the process, information regarding the application settings, files, and other data of the first computer-based device are stored in data servers 110 and 112.

Figure 2:
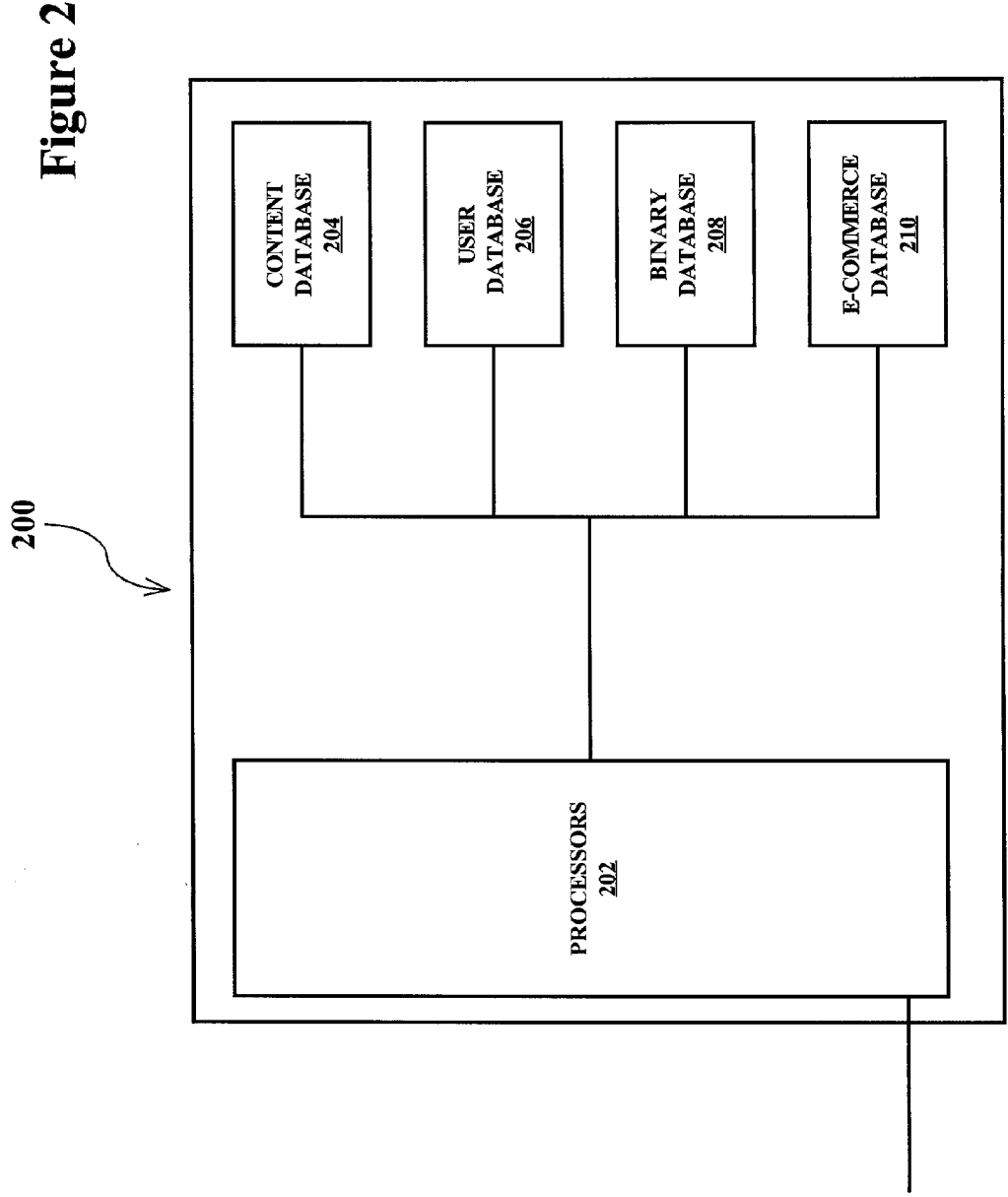
FIG. 2 illustrates the various data servers of the server system of the present invention.

FIG. 2 illustrates the various data servers associated with the server system of the above-mentioned application. Server system 200 contains content database 204 for the purpose of storing any data that is displayed to the user, e.g., GUIs, web site pages, advertisements, offers, etc., as well as any data related to applications and application settings obtained from the manufacturers of the respective software applications. This database will be updated frequently to continually contain the most current data regarding software applications and their application settings. Server system 200 also contains user database 206 for the purpose of storing data related to each individual user's computer-based device, personal profile, applications, account number, login password to the system server, etc. Processors 202 will utilize this user data to facilitate the transfer process. The user data can also be used to trigger the server system to display to the user, via the web site, advertisements and offers targeted to the user's particular profile, as discussed below in further detail. Furthermore, server system 200 also contains Binary Database 208 to store binary files, e.g., documents, e-mails, address books, etc. uploaded from first computer-based device 100. The user selects specific data stored for download to second computer 106. Server system 200 also contains e-commerce database 210 to store data related to on-line purchases by the user with relation to the transfer process. For instance, during the transfer process, the server system may have detected and informed the user that a software application on first computer-based device 100 has since been upgraded. In turn, the user may decide to purchase, through the server system, the most recent upgraded version of the software for the second computer-based device. All the data necessary for this purchase, e.g. credit card information, billing information, etc., can be handled and stored in this database.

Figure 3:
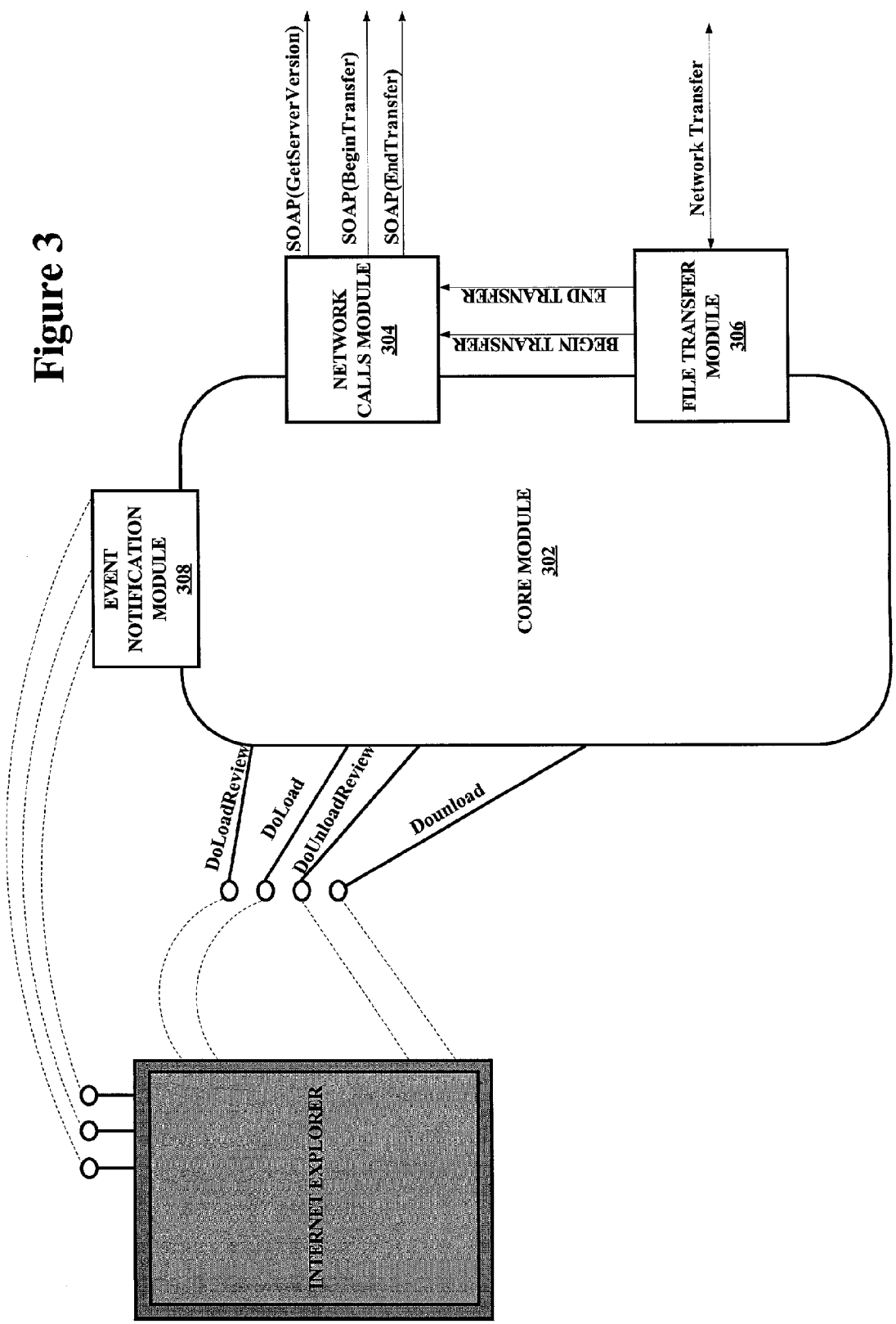
FIG. 3 illustrates the architecture of the settings extractor and injector module (SEIM).
Figure 4:
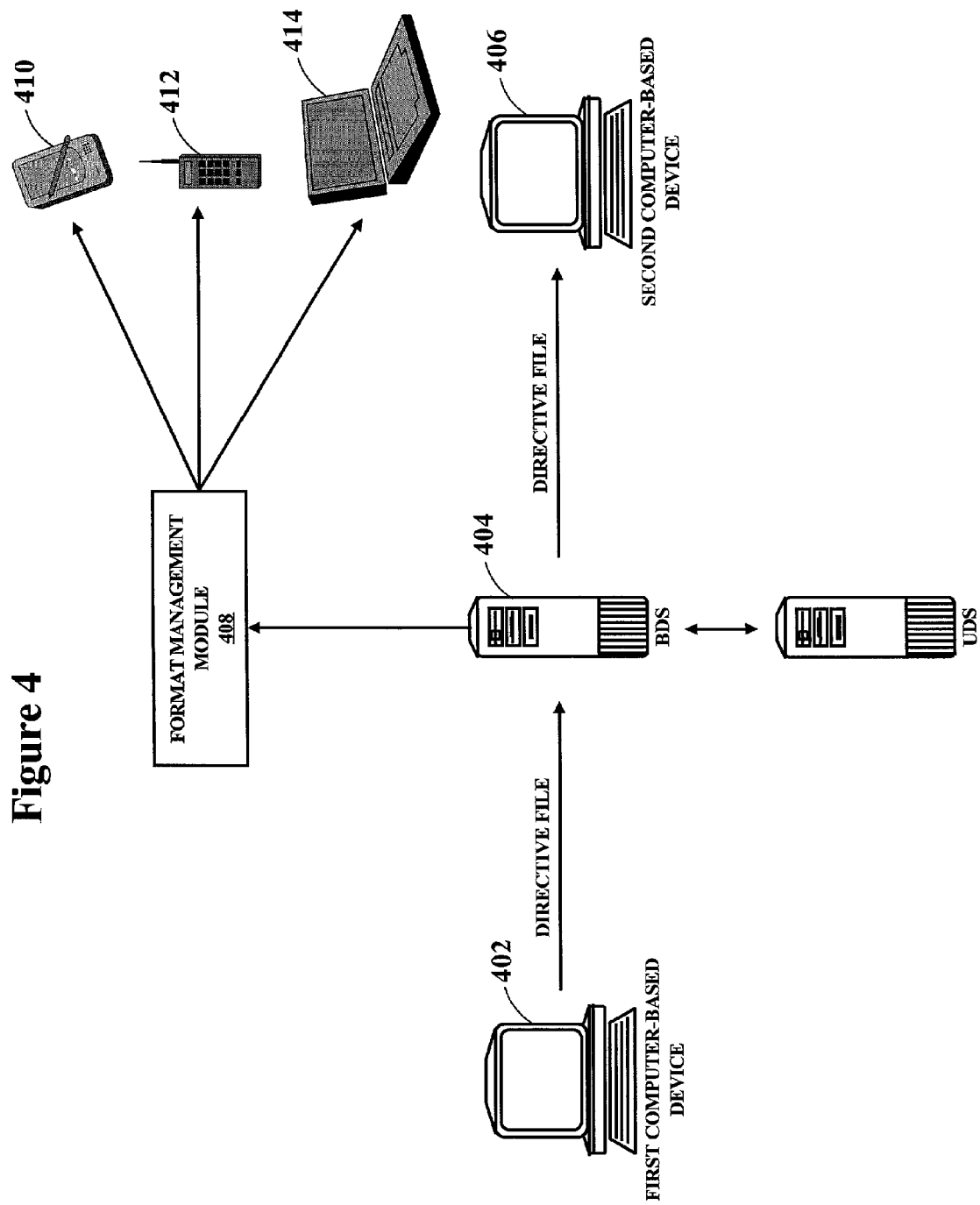
FIG. 4 illustrates the format management system as described in the co-pending application entitled, "Virtual Access".

The co-pending application, entitled "System and Method for Transferring Settings and Files Defining an Operating Environment utilizing a Software Module", describes a software module (SEIM) that facilitates the exchange of application settings, files, and other data. A general description of the software module is given below, but a complete discussion of the SEIM may be found in said co-pending application. The SEIM is the module of the system that runs on both the source and target device. The module performs functions including scanning the registry, interacting with the user, and communicating with an Application Server using "network calls." The architecture of the SEM is discussed with reference to FIGS. 3. The entire SEIM component is built as a set of modules as shown in FIG. 4. The SEIM component comprises core module 302, network calls module 304, file transfer module 306, and event notification module 308. Core module 302 natively provides access to the services of the operating system and exposes the four automation methods, which may be called by scripted routines on the server side. The core module maintains functionality so that the SEIM can be accessed and executed by other applications on the computer-based device, particularly the browser. It utilizes Network Calls Module 304 and File Transfer Module 306 for all interaction with Application Server 108 and Binary Data Server 112. Thus, Network Calls Module 304 is responsible for communicating with the Application Server 108, and File Transfer Module 306 encapsulates the actions needed for all transfer of files between the client and servers. Furthermore, Event Notification Module 308 provides the interfaces for browsers to receive notifications from the core module 302.

The co-pending application entitled, "Virtual Access", describes a system for processing extracted and stored settings for new or different computer-based devices. FIG. 4 illustrates this system wherein a profile is uploaded from a computer-based device 402 and stored onto the BDS 404 in an XML-based directive file. Next, another computer-based device 406 is able to access the directive file on the BDS 404, if a user wants to configure the second computer-based device 406 to have the same environment as the first computer-based device 402. In the event the second computer-based device does not have the same operating platform as the first device, a conversion of the directive file to a format that is compatible with the second computer-based device(s) 410, 412, 416 is necessary and is done via a format management module 408.

Figure 5:
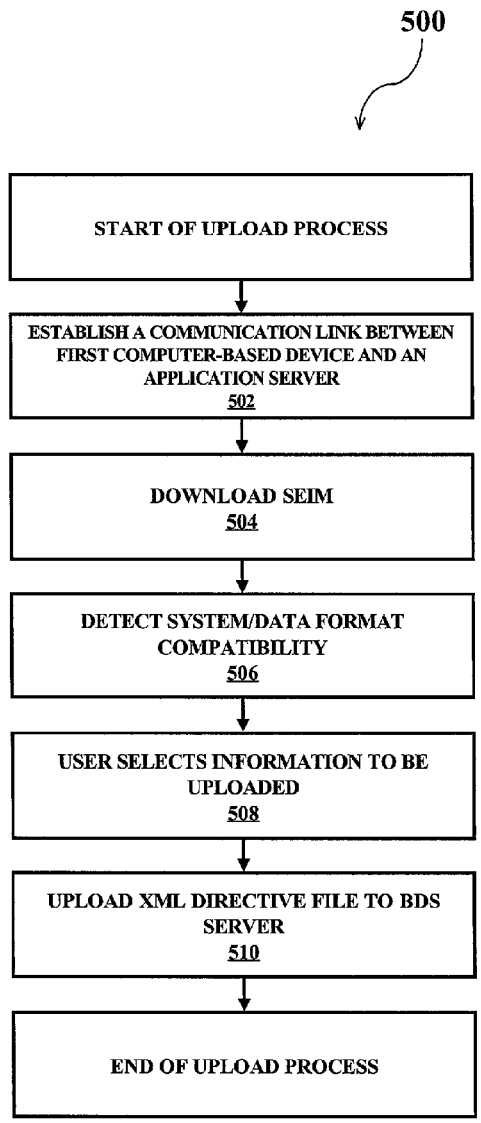
FIG. 5 illustrates a flowchart of the method associated with the upload scenario.

FIG. 5 illustrates the flowchart of the method 500 associated with a profile upload scenario. First, a communication link is established 502 between the first computer-based device 402 and the Application Server 108. Next, if all the necessary components are found on first computer-based device 402, a SEIM is downloaded 504 onto the first computer-based device 402. Next, the system detects the system and data compatibility format 506, so it knows what scripts to use. The user then selects information (comprising any of the following: application settings, files, and other data) 808 to be uploaded onto a server. Last, the SEIM then uploads an XML directive file 510 with the selected information onto the binary data server.

Figure 6:
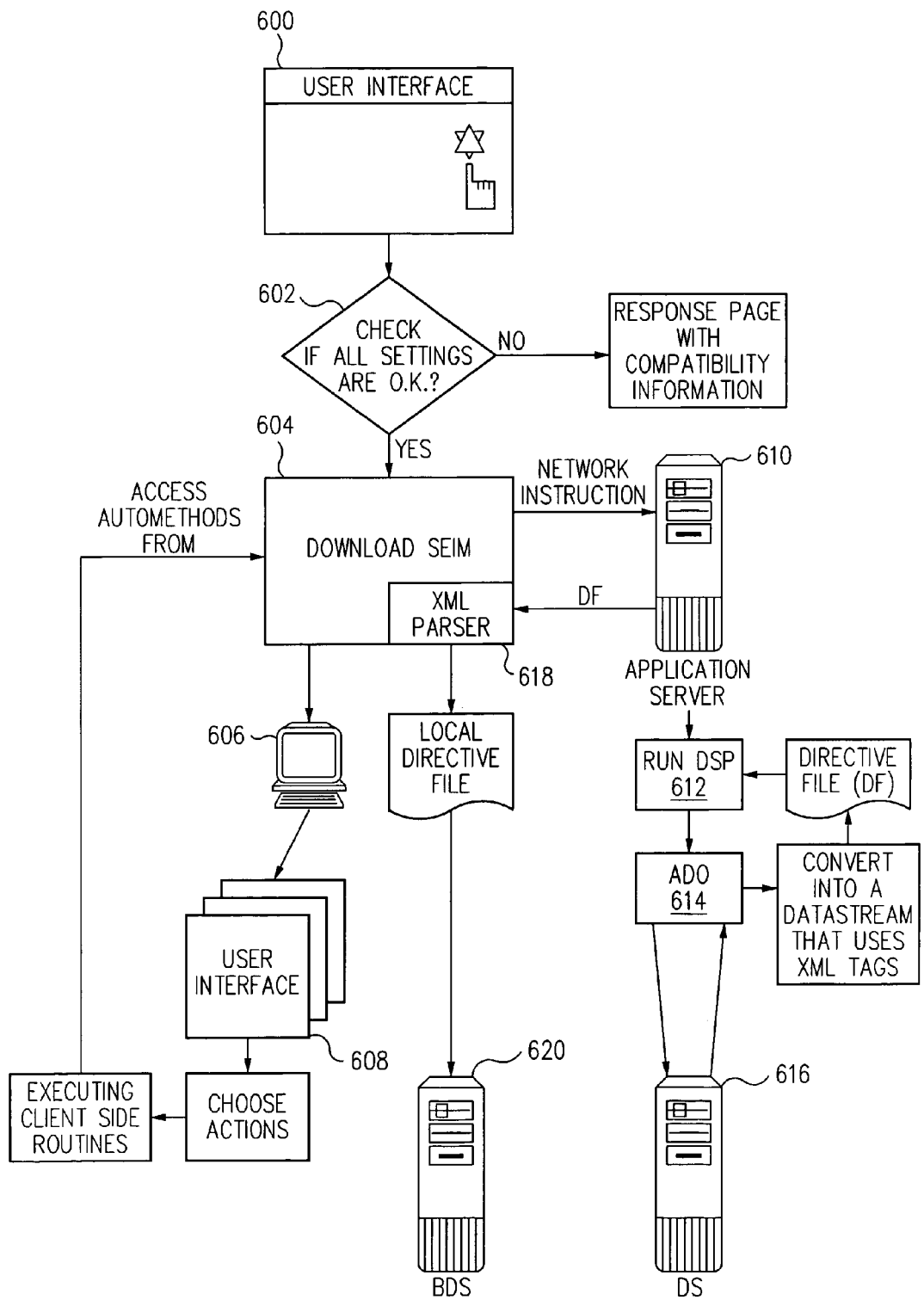
FIG. 6 illustrates the system associated with the method of FIG. 5.

FIG. 6 illustrates a detailed description of the system associated with the upload scenario. First, a software module (SEIM 604) is downloaded onto the first computer-based device 606. This can be accomplished in a variety of ways.

In one embodiment, a user interface such as a website is accessed by consumers who download a software module (SEIM 604) by clicking on an icon on a web page 600. In a further embodiment, a check 602 is performed to see if the settings on the first computer-based device 606 make it compatible to download the software module (SEIM 604), and upon establishment of compatibility, the SEIM 604 is downloaded. In the event of incompatibility, a response page is presented to the consumer indicating what needs to be upgraded on the first computer-based device 606 for successful execution of the software module (SEIM 604).

After SEIM 604 is successfully downloaded onto the first computer-based device, user interface 608 is generated to get input from the user. In one embodiment, user interface 608 is a set of network web pages. After reviewing the user interface 608, users decide which files, settings, or other data need to be uploaded to a server for storage. Next, an instruction is sent from the SEIM 604 to the application server 610 regarding information on the location of the files, settings, and other data to be uploaded. The application server 610 then runs a Dynamic Server Page (DSP) 612 invoking the SMOD, whidh then uses an Active Data Object (ADO) 614 to query the database server 616. Next, database server 616 returns a resultant set in ADO 614 that contains the location info to be uploaded. The SMOD then steps through the records and creates a data stream that uses XML tags. This XML format of data with tags specific to the present invention is called a directive file. The directive file is then passed on to XML parser 618 in the SEIM 604 where it is parsed and relevant files, settings, or other data are extracted. Then, the extracted data is accumulated in yet another directive file called the local directive file. Lastly, the local directive file is uploaded to binary data server 620 using a network transfer instruction.

Figure 7:
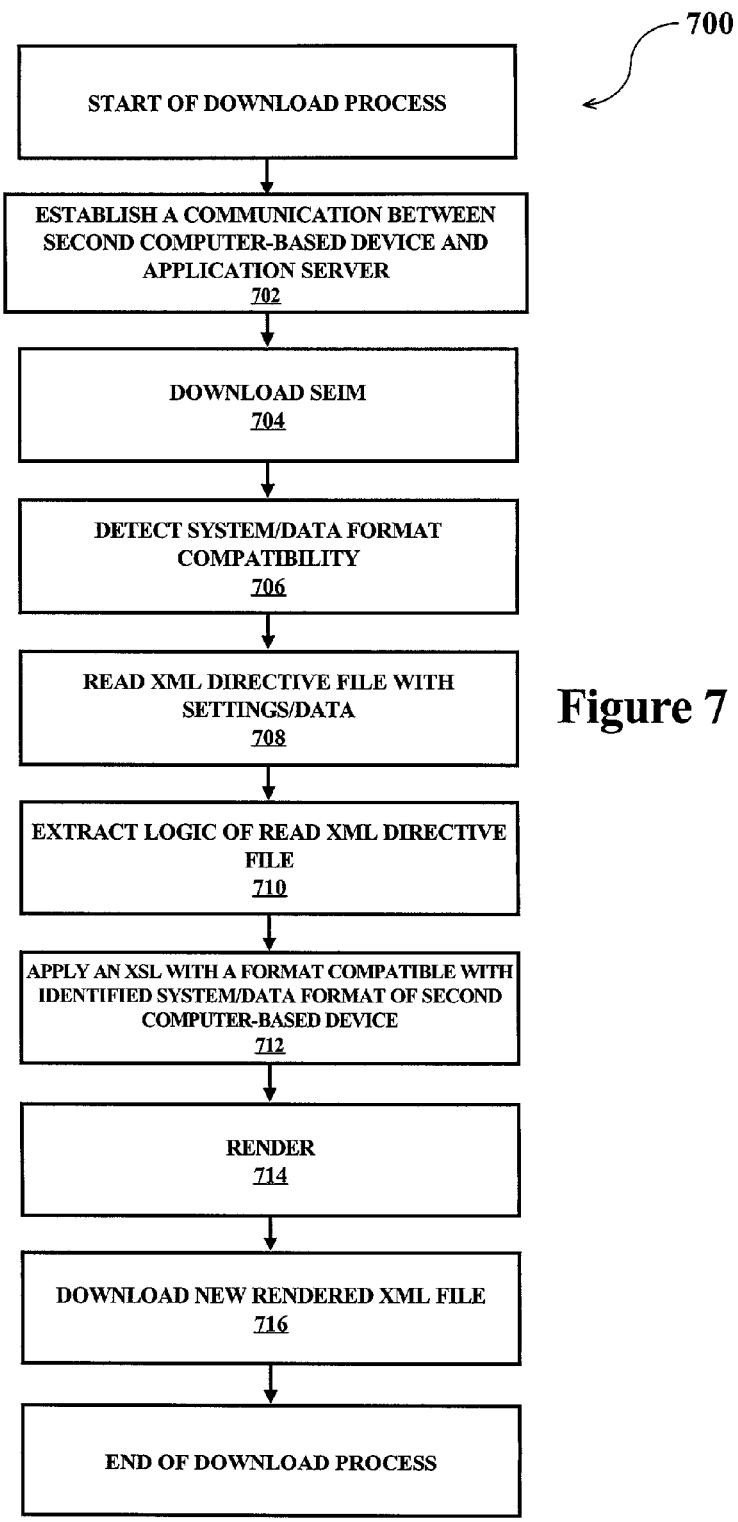
FIG. 7 illustrates a flowchart of the method associated with the download scenario.

FIG. 7 illustrates the flowchart of the method 700 associated with the download scenario. First, like the upload scenario, a communication link is established 702 and after detection of all necessary components, a SEIM is downloaded 704 onto the second computer-based devices (410, 412, 414). Next, the system detects the data and system compatibility formats 706, to determine the parameters and limitations of the format for the downloaded. Furthermore, the stored XML directive file is read by SMOD 708 and processed to extract the logic 710 associated with said XML file. Next, an XSL style sheet 712, with a format compatible with the second computer-based device is applied and rendered 714 with respect to the end client's resource type format. Lastly, the downloaded rendered XML directive file is parsed and the new settings take effect 716.

Figure 8:
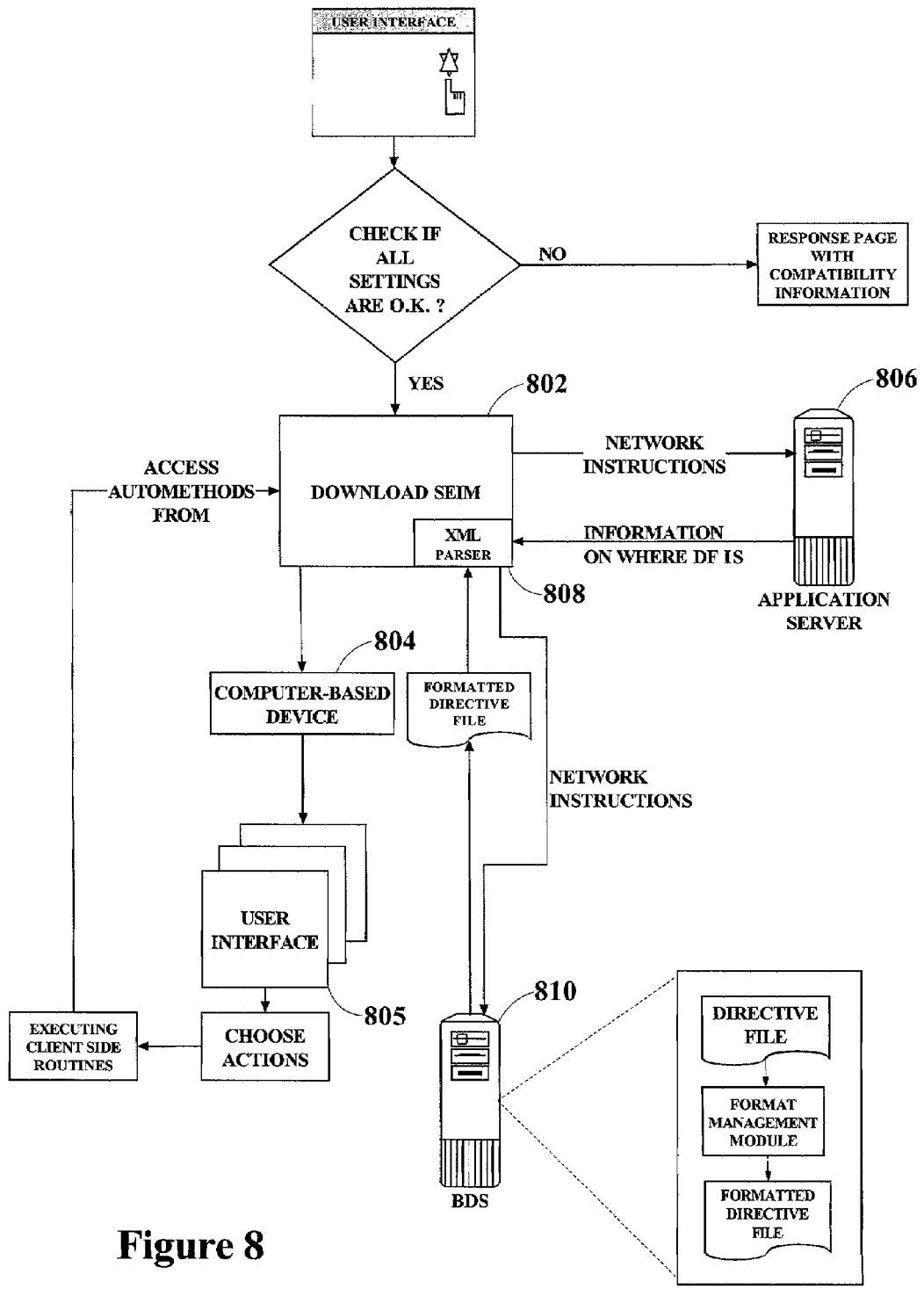
FIG. 8 illustrates the system associated with the method of FIG. 7.

The system associated with the method of FIG. 7 is described in FIG. 8. First, software module (SEIM) 802, compatible with second computer-based device 804, is downloaded onto said device 804 via network data transfer and using a user interface such as a webpage. In one embodiment, in the event of incompatibility, the system provides the second computer-based device(s) 804 with a response page with compatibility information. Next, the SEIM 802 identifies the file and data format associated with the second computer-based device 804. A user then requests various files, settings, and other data via interface 805 generated by the SEIM 802. The SEIM 802 then sends a network data transfer instruction to the application server 806 requesting information regarding the location of a directive file which contains information requested by the user regarding the settings, files, and other data that need to be downloaded. The application server 806 then passes this information onto the parser 808 located in the SEIM 802.

Next, The SEIM 802 sends a network data transfer instruction to the binary database server (BDS) 810 requesting said directive file in a format compatible with computer-based device 804. The BDS 810 extracts the corresponding directive file and uses a format management module to render the directive file in a format compatible with the second computer-based device 804. Lastly, the BDS 810 returns the requested directive file to the second device 804. Once the requesting computer-based device 804 receives the directive file (containing the application settings, files, and other data), the software module (SEIM) 802 parses the directive file (via the XML parser 808), installs and updates necessary settings, files, and other data in their respective locations making the receiving computer-based device's operating environment similar to that of the first computer-based device. In a further embodiment, an option is provided in the SEIM 802 such that users can revert back to the operating environment previously held by the receiving computer-based device if they are not satisfied with the newly installed profile. server 806 requesting information regarding the location of a directive file which contains information requested by the user regarding the settings, files, and other data that need to be downloaded. The application server 806 then passes this information onto the parser 808 located in the SEIM 802. Next, The SEIM 802 sends an network data transfer instruction to the binary database server (BDS) 810 requesting said directive file in a format compatible with computer-based device 804. The BDS 810 extracts the corresponding directive file and uses a format management module to render the directive file in a format compatible with the second computer-based device 804. Lastly, the BDS 810 returns the requested directive file to the second device 804. Once the requesting computer-based device 804 receives the directive file (containing the application settings, files, and other data), the software module (SEIM) 802 parses the directive file (via the XML parser 808), installs and updates necessary settings, files, and other data in their respective locations such thatmaking the receiving computer-based device's operating environment similar to that of the first computer-based device. In a further embodiment, an option is provided in the SEIM 802 such that users can revert back to the operating environment previously held by the receiving computer-based device if they are not satisfied with the newly installed profile.

Thus, from a system's perspective, the server system of the present invention obtains settings from a computer-based device in two stages: Load Review stage and Load stage. The Load Review stage gathers information about the user's computer-based device. The Load stage is responsible for moving the user's settings and files to the server.

Generally, after the information is gathered on the user's computer-based device, a scripted routine invokes a load method on the SEIM. The SEIM starts by making a network call to an Application Server to ask it to provide instructions on how to collect the settings that the user has chosen. The network call causes the Application Server 108 to run a Dynamic Server Page (DSP) that invokes the SMOD, using an Active Data Object (ADO) to run a query on a database located at the Database Server 110. The Database Server returns a result set that contains the information about how to collect each setting (for example, a record in the result set might say that the Outlook-2000® personal address book is identified by their registry key HKCU\Software\Microsoft\Outlook\PAB). The SMOD receives the entire result set from the Database Server 110 in the Active Data Object. The SMOD steps through each record in the ADO and converts it into a data stream that uses XML tags to delineate the fields in the records. This XML format of data with the website specific tags is called a directive file. The directive file is returned to the SEIM as a response from the network call. The SEIM uses its XML Parser to decode the instructions from the application server. It then executes the instructions in the Directive File (For example, it would fetch the value in HKCU\Software\Microsoft\Outlook \PAB). The SEIM accumulates the settings data into a local directive file as it runs each instruction. When done, the SEIM makes a network call to upload the directive file to the Binary Data Server 112. The SEIM then makes a network call to tell the server 108 that the settings have been uploaded.

Specifically, as explained following, this overall process is performed in six parts, three parts during the Load Review stage and three parts during the Load stage.

Load Review

After the user has logged on to the system, he/she will be asked to wait while the system determines the applications that are installed on the client . The system interaction for this stage comprises 3 parts: Getting the Load Review directive file, Client processing of the Load Review directive file, and Server processing of the load review directive file.

Getting the Load Review Directive File

Figure 9:
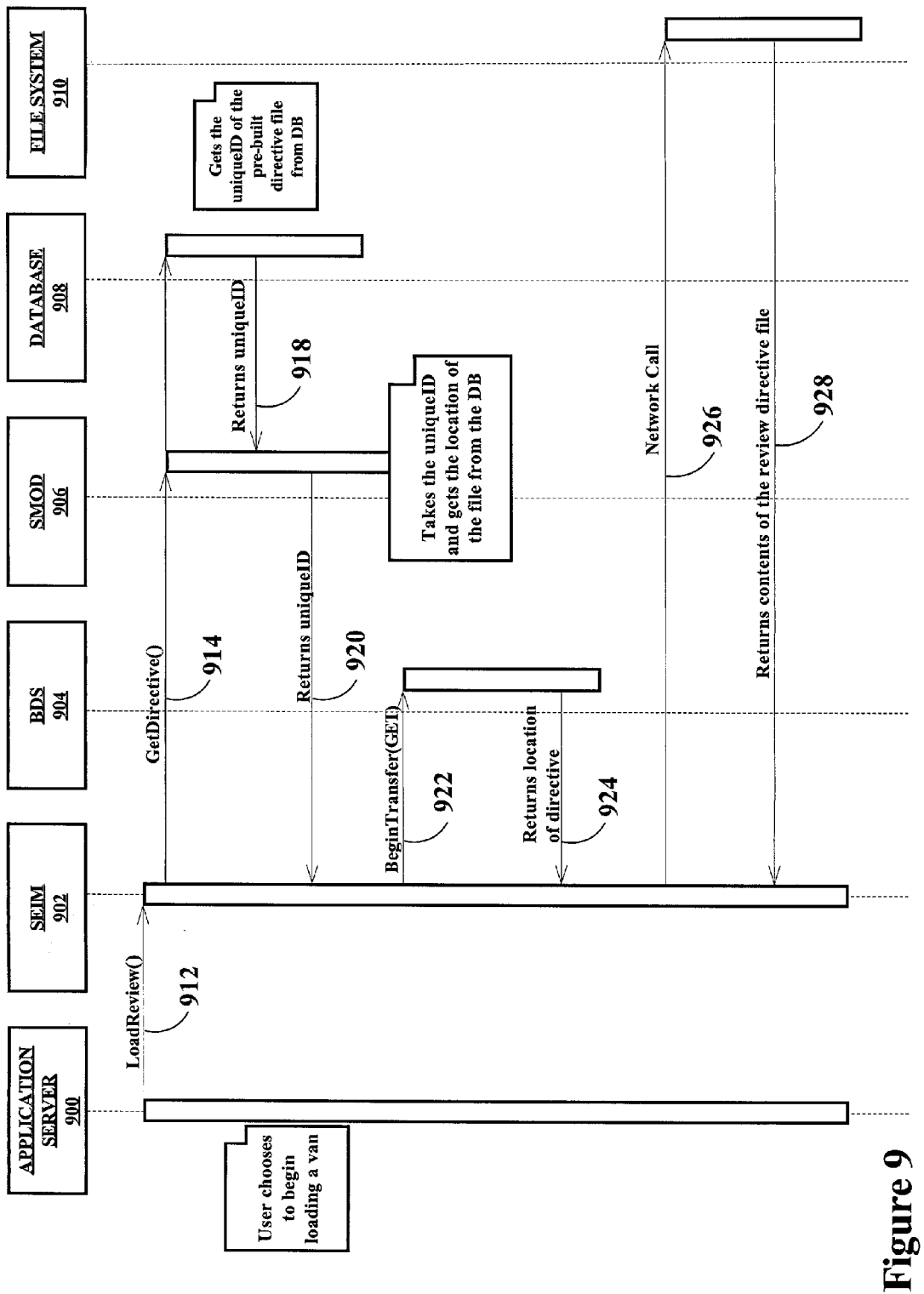
FIG. 9 illustrates the steps performed when retrieving the load review directive file.

The sequence diagram of FIG. 9 illustrates the steps performed when retrieving the load review directive file.

After the user has chosen to load transfer application settings, etc., the Application Server 900 downloads the SEIM 902 (if not already present) and makes the LoadReview call 912 to it. The LoadReview call causes the SEIM 902 to follow the automated steps of retrieving the load review directive. The SEIM 902 has an automated method for determining the operating system of the computer-based device, which it first performs, then the SEIM 902 performs a call to the SMOD 906 to get the load review directive file 914.

The SEIM 902 makes this call to the SMOD 906 through a dynamic server page. The SMOD 906 retrieves a unique ID 918 of the review directive file. In particular, this information is retrieved from the content database. SMOD 906 then returns the uniqueID 920 of the review directive file back to the SEIM 902.

Preferably, there is another DSP method of the SMOD 906 that will build the review directives called BuildReviewDirectives. This generates the review directives from the snippets stored in the database, puts the files in the BDS file system, and puts the appropriate rows in the Catalog and DirectiveLocation tables. BuildReviewDirectives allows administrators of the system to update the review directive files after support for more applications has been added into the content database. Thus, the present invention allows unlimited recognition of future formats, platforms, devices, etc., through updating of directive files without modification of the SEIM.

| DYNAMIC UPDATING OF SCRIPTS |
|---|
| Example of a DirectiveFile for Windows Millennium Edition with Internet Explorer Before WinZip Data is Added |

```
<DirectiveFileVersion>
    1.0
    - <ReviewDirective>
        - <PID>
            230
            <Description>Windows Millennium Edition</Description>
            - <and>
                    <KeyExists>HKLM\SOFTWARE\Microsoft\Windows</Key
                    Exists>
                - <or>
                    - <ValueExistsAndMatches>
                            HKLM\SOFTWARE\Microsoft\Windows\CurrentVersion\
                            ProductName
                            <Value>Microsoft Windows ME</Value>
                        </ValueExistsAndMatches>
                    - <ValueExistsAndMatches>
                            HKLM\SOFTWARE\Microsoft\Windows\CurrentVersion\
                            ProductName
                            <Value>Microsoft Windows Millennium
                                Edition</Value>
                        </ValueExistsAndMatches>
                </or>
            </and>
            - <FileSize>
                    <StoreFileAtValue>HKCU\Control
                    Panel\Desktop\Wallpaper</StoreFileAtValue>
                </FileSize>
        </PID>
        - <PID>
            6
            <Description>IE 4/5/5.5</Description>
            - <and>
                    <KeyExists>HKLM\SOFTWARE\Microsoft\Internet
                    Explorer</KeyExists>
                - <or>
                        <KeyExists>HKLM\SOFTWARE\Microsoft\IE4
                        </KeyExists>
```

DYNAMIC UPDATING OF SCRIPTS
*-continued*

```xml
                <KeyExists>HKCU\Software\Microsoft\Windows\
                    CurrentVersion\Internet Settings\5.0</KeyExists>
            </or>
        </and>
        <FileSize>
                <StoreTreeAtValue>HKCU\Software\Microsoft\Windows\
                    CurrentVersion\Explorer\Shell
                    Folders\Favorites</StoreTreeAtValue>
                <StoreTreeAtValue>HKCU\Software\Microsoft\Internet
                    Explorer\Desktop\General</StoreTreeAtValue>
                <StoreFileAtValue>HKCU\Software\Microsoft\Internet
                    Explorer\Desktop\General\Wallpaper</StoreFileAtValue>
                <StoreFileAtValue>HKCU\Software\Microsoft\Internet
                    Explorer\Desktop\General\BackupWallpaper</StoreFileAt
                    Value>
        </FileSize>
    </PID>
  </ReviewDirective>
</DirectiveFileVersion>
```

Example of a DirectiveFile for Windows Millennium Edition with Internet Explorer and WinZip Support After Data is Added

```xml
<DirectiveFileVersion>
    1.0
    <ReviewDirective>
        <PID>
            230
            <Description>Windows Millennium Edition</Description>
            <and>
                <KeyExists>HKLM\SOFTWARE\Microsoft\Windows</Key
                    Exists>
                <or>
                    <ValueExistsAndMatches>
                        HKLM\SOFTWARE\Microsoft\Windows\CurrentVersion\
                        ProductName
                        <Value>Microsoft Windows ME</Value>
                    </ValueExistsAndMatches>
                    <ValueExistsAndMatches>
                        HKLM\SOFTWARE\Microsoft\Windows\CurrentVersion\
                        ProductName
                        <Value>Microsoft Windows Millennium
                            Edition</Value>
                    </ValueExistsAndMatches>
                </or>
            </and>
            <FileSize>
                <StoreFileAtValue>HKCU\Control
                    Panel\Desktop\Wallpaper</StoreFileAtValue>
            </FileSize>
        </PID>
        <PID>
            6
            <Description>IE 4/5/5.5</Description>
            <and>
                <KeyExists>HKLM\SOFTWARE\Microsoft\Internet
                    Explorer</KeyExists>
                <or>
                    <KeyExists>HKLM\SOFTWARE\Microsoft\IE4</
                        KeyExists>
                    <KeyExists>HKCU\Software\Microsoft\Windows\
                        CurrentVersion\Internet Settings\5.0</KeyExists>
                </or>
            </and>
            <FileSize>
                <StoreTreeAtValue>HKCU\Software\Microsoft\Windows\
                    CurrentVersion\Explorer\Shell
                    Folders\Favorites</StoreTreeAtValue>
                <StoreTreeAtValue>HKCU\Software\Microsoft\Internet
                    Explorer\Desktop\General</StoreTreeAtValue>
                <StoreFileAtValue>HKCU\Software\Microsoft\Internet
                    Explorer\Desktop\General\Wallpaper</StoreFileAtValue>
                <StoreFileAtValue>HKCU\Software\Microsoft\Internet
                    Explorer\Desktop\General\BackupWallpaper</StoreFileAt
                    Value>
```

-continued

DYNAMIC UPDATING OF SCRIPTS

```
        </FileSize>
    </PID>
  - <PID>
        34
        <Description>WinZip</Description>
        <KeyExists>HKCU\Software\Nico Mak
            Computing\WinZip\WinZip</KeyExists>
    </PID>
  </ReviewDirective>
</DirectiveFileVersion>
```

The load review directive file is stored on the BDS file system 910. In order to retrieve the directive file, SEIM 902 uses the HTTP protocol to transfer the file from the BDS file system 910 to the local computer-based device. In order to retrieve the directive file, SEIM 902 must know the actual location of the review directive file on BDS file system 910. The uniqueId of the review directive file and an active server page of BDS 904 is utilized to retrieve this information. The SEIM 902 makes a BeginTransfer call passing the uniqueID to BDS 922. BDS then returns the location 924 of the load review directive file to the SEIM 902. An exemplary Begin-Transfer call 922 for a review directive looks like:
/actions/bds/BeginTransfer.asp?sSessionID=
133794890&sMode=GET&nUniqueID=70302
An exemplary response 924 from BDS 904 is:

the file (in GUID form), which is followed by a "-", followed by a randomly generated text string (as illustrated in the location contained in <URI> tag above). However, in the system, files are referred to by a number called a uniqueId. UniqueIDs are mapped to file locations and file attributes by a table in the binary database called the catalog table. This keeps track of information gathered about the file from the user's computer-based device. It includes the file system attributes (nFlagsAndAttributes, etc.), where the file belongs on the user's computer-based device (sFullPath), the product that a file is associated with (nPID), and the location where it can be found on the BDS (sURI). A schema diagram of the catalog table is illustrated in FIG. 10.

Since the Review Directives are also stored in the BDS, there is also a corresponding row in the catalog table for

```
<HTML>
<HEAD>
<TITLE></TITLE>
</HEAD>
<BODY>
<pid>0</pid>
<pathname>ReviewDirective.xml</pathname>
<flags>O</flags>
<creationhi>0</creationhi>
<creationlo>0</creationlo>
<lastaccesshi>0</lastaccesshi>
<lastaccesslo>0</lastaccesslo>
<lastwritehi>0</lastwritehi>
<lastwritelo>0</lastwritelo>
<filesizehi>0</filesizehi>
<filesizelo>0</filesizelo>
<uri>/actions/bds/data/{00000000-0000-OODO-0000-000000000000}-halsexmvfthpkwz</uri>
<sResult>Success</sResult>
<sInfo>File exists at  /actions/bds/data/{00000000-0000-0000-0000-000000000000}-halsexmvfthpkwz.</sInfo>
</BODY>
</HTML>
```

The SEIM 902 parses the response to get the location. In the above example, the response indicates to the SEIN 902 that the load review directive file is located on BDS file system 910 at "/actions/bds/data/{00000000-0000-0000-0000-000000000000}-halsexmvfthpkwz."

A discussion of the BDS 904 and associated file system 910 will aid in the understanding of the above steps and associated examples. The binary data files for a computer-based device are stored in the file system of the APPLICATION SERVER 900. The part of the APPLICATION SERVER file system which these binary data files are stored is considered BDS file system 910. By way of example, these data files are located in the "\actions\bds\data" directory. The naming convention of the files is the ID number for each of them. The only part of the catalog table that is of concern for review directives is the nUniqueID and sURI columns in the table. There is another table in the content database, DirectiveLocation, that SMOD 906 uses to determine the uniqueID for the review directive that has been requested.

Having obtained the location for the load review directive file, the SEIM 902 performs an network call such as an HTTP GET transfer 926, which returns the contents of the review directive file 928.

Processing the Load Review Directive on the Client

Figure 11:
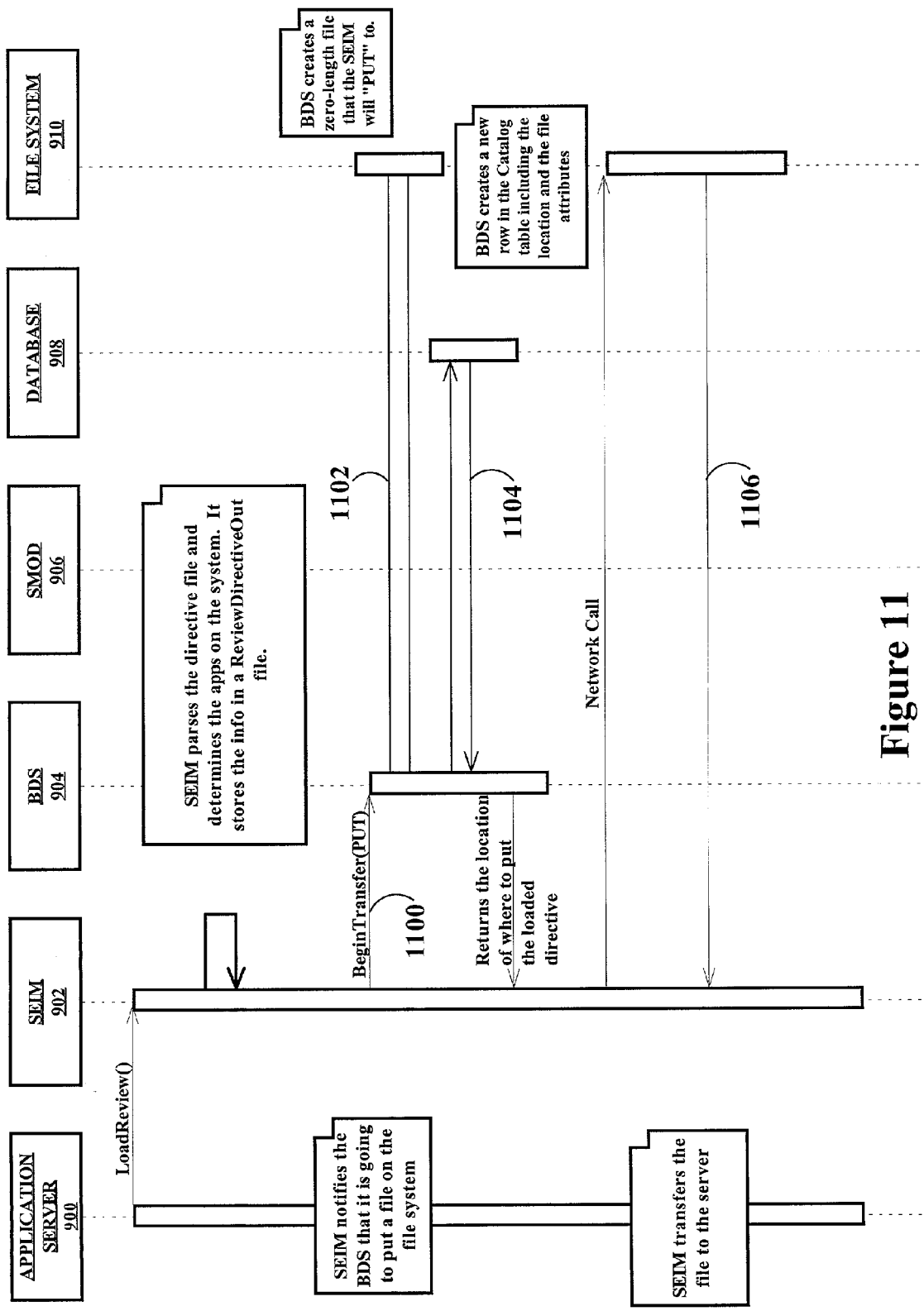
FIG. 11 illustrates the steps occurring during the processing of the load review directive.

Having retrieved the load review directive file, the SEIM 902 follows the instructions of this file to determine the applications that are installed on the computer-based device. Details for this process are illustrated in FIG. 11. Numerals indicating the various components of the system remain the same as those utilized with FIG. 9.

The following is an example (shortened) review directive file:

```
<DirectiveFileVersion>1.0
<ReviewDirective>
<PID>26
<Description>IE 4.0</Description>
<and>
<KeyExists>HKCU\Software\Microsoft\Internet    Explorer</KeyExists>
<ValueDoesNotExist>HKCU\Software\Microsoft\Windows\CurrentVersion\Internet
Settings\S.D.\Cache\Signature</ValueDoesNotExist>
</and>
</PID>
</ReviewDirective>
</DirectiveFileVersion>
```

The XML tags represent the commands or the instructions that tell the SEIM 902 how to determine if an application exists. The SEIM 902 does the evaluation as the tag is encountered in the parsing process. For example, the above review directive file would be used to determine if IE 4 is on the user's computer-based device. As described above, the PID is the Product ID. Each application that is supported has its own PID. Different versions of the same application have different PIDs. The XML instructs the SEIM 902 that if the "HKCU\Software\Microsoft\Internet Explorer" key exists in the registry and there is not a value for the key "HKCMSoftware\Microsoft\Windows\CurrentVersion\Internet Settings\5.0\Cache\Signature", then the user's computer-based device has IE 4 installed on it. <KeyExists>and <ValueDoesNotExist>are examples of tag instructions that the SEIM 902 knows how to process. To process these instructions, the SEIM 902 looks in the registry, and in some cases the file system, to determine if applications exist on the computer-based device. As it is doing this parsing process, it is also creating the XML results, the ReviewDirectiveOut file. Following is an example of the results from this search, which indicates that IE 4.0 does not exist on the user computer-based device.

<DirectiveFile Version>1.0
<ReviewDirectiveOut>
<PID>26
<Description>IE 4.0</Description>
<Value>FALSE</Value>
</PID>
</ReviewDirectiveout>
</DirectiveFileVersion>

As shown in FIG. 11, once the SEIM 902 has parsed and processed the load review directive file, the created ReviewDirectiveOut file needs to be put on the server. To do this, the SEIM 902 performs a BeginTransfer call to BDS 904, to notify the BDS 904 that a file needs to be put in file system 910. Ultimately, BDS 904 will return the location of where to put the file. The following is the query string that is sent.

\actions\bds\BeginTransfer.asp?sVanID.(DOAB4C48-ISC3-IID4-9DB9-0000C0540132)&sSessionID-133794890 nPID=−1&
sMode=PUTQ
FullPath.C:
\Programt2OFiles\PCMovingVan\ReviewDirective.Out.xml&
nFlagsAndAttributes=0&
nCreationTimeLow=0&
nCreationTimeHigh=0&
nLastAccessTimeLow=0& SVC-3003555 nLastAccessTimeHigh=0&
nLastWriteTimeLow=0&
nLastWriteTimeHigh=0&
nSizeLow-O&
nSizeHigh=0

This causes BDS 904 to create a zero-length file 1102 on file system 910 that the SEIM 902 can transfer the ReviewDirectiveOut file to. The zero-length file is created to ensure that no other file on the file system has the same name. Then BDS 904 adds a row to the catalog table in the database 1104 with the file attribute and location information. The PID in this case is −1, as review files are not associated with a particular product. Also, the attribute information is blank, as this file will not be transferred back to a computer-based device. The call returns with a result similar to the following, which tells the SEIM 902 where to transfer the file.

<HTML>
<HEAD>
<TITLE></TITLE>
</HEAD>
<BODY>
<fileid>79465</fileid>
<Uri>/actions/bds/data/@DAB4C48-ISC3-IID4-9DB9-0000CO540132)-olkfrrxabccfmc</ uri>
<sResult>Success</sResultlt>
<sInfo>File   /actions/bds/data/(DOAB4C48-IBC3-IID4-9DB9-0000CO540132)-olkfkrrxabccfmc   created.</sInfo>
</BODY>
</HTML>

After obtaining this response, the SEIM 902 performs a network call such as an HTTP PUT, transferring the ReviewDirectiveOut file to the BDS to the /actions/bds/data/{DOAB4C48-1BC3-1   1D4-9DB9-0000C0540132}-olk-fkrrxabccfmc data file 1106.

Processing the Load Review Directive on the Server

Figure 12:
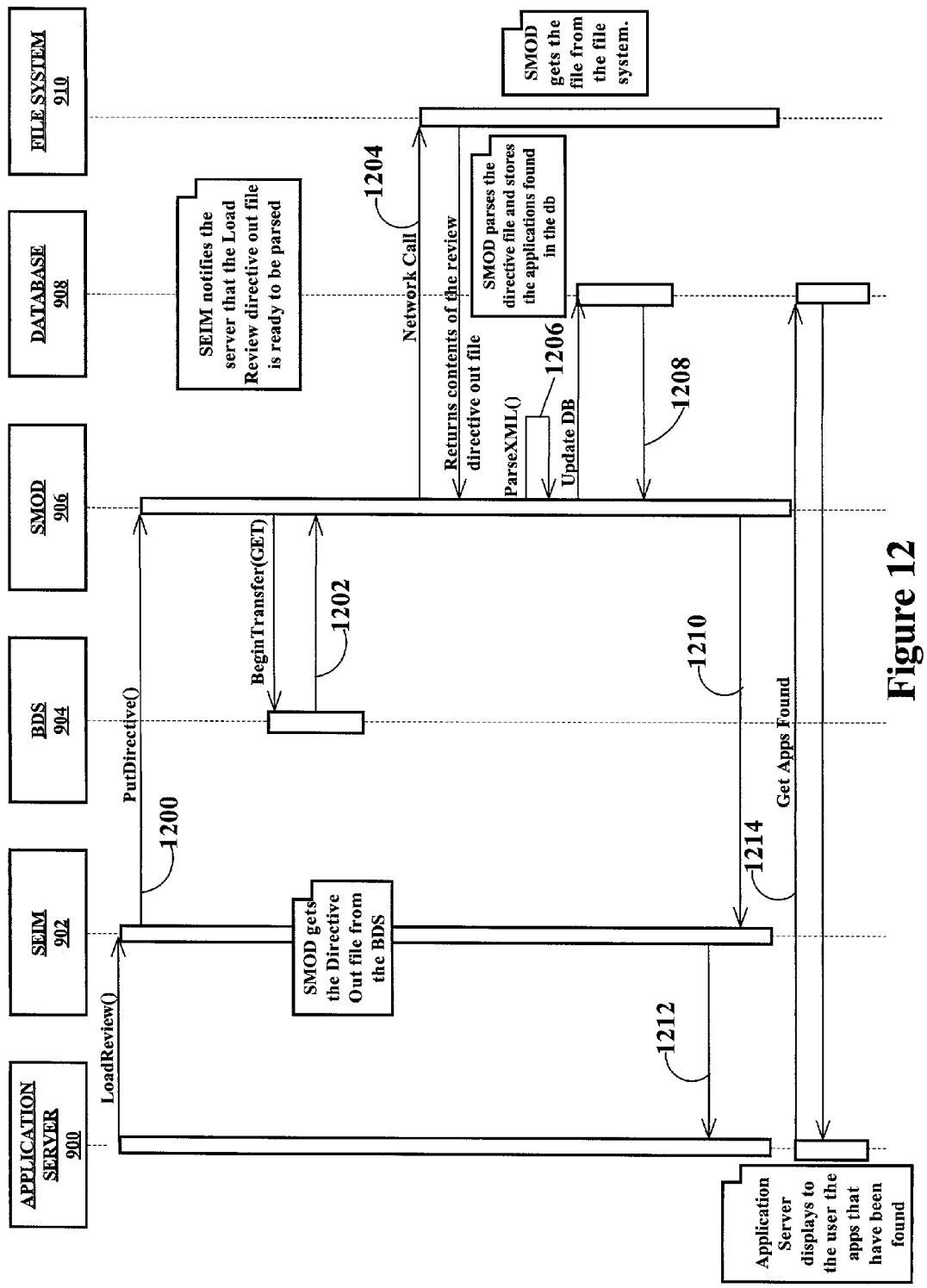
FIG. 12 illustrates the processing of the load review directive on the server.

Once the SEIM 902 has determined the applications that are installed on the client's computer-based device, and put the results on file system 910, the ReviewDirectiveOut file is processed. This process is illustrated in FIG. 12. As before, numerals designating various components of the system remain the same as those utilized with FIG. 9.

The SEIM 902 notifies SMOD 906 that there is a directive file ready to be parsed by making the PutDirecitve call 1200. A typical call is as follows:

/actions/smod/PutDirective.asp?sVanID-(DOAB4C48-IBC3-IID4-9DB9-0000COS40132) &sSessionID=133794890&eType-O&sOS=WinNT&nUniqueID.7946S SMOD 906, in turn, resolves the uniqueId to a file location 1202 on file system 910 via BDS 904 and gets the file through a network call such as an HTTP GET 1204. SMOD 906 then parses the file 1206 and stores the applications that were found in the database in the VanApp table 1208. FIG. 13 illustrates the schema of VanApp table.

For every application that is found on the user computer-based device, one row is put into the VanApp table. This information is used later when the Load Directive file is built. The Type determines whether the application was found on the old computer-based device (0) or the new computer-based device (1). The IncludeInLoad and IncludeInUnload columns are modified based on the results of the selections made by the user in an expert mode. These columns indicate which application settings and files will actually be transferred based upon the choices made by the user. Once this is complete, PutDirective returns back 1210 to the SEIM 902, which returns back 1212 to the APPLICATION SERVER 900 to signal the end of the LoadReview call. The following is an example of a PutDirective reply:

<HTML>
<HEAD>
<META NAME-"GENERATOR" Content=,"Microsoft Developer Studio">
<META HTTP-EQUIV-"Content-Type" content="text/html; charset=iso-8859-111">
<TITLE>PutDirective</TITLE>
</HEAD>
<BODY>
<sResult>Success</sResult>
</BODY>
</HTML>

The APPLICATION SERVER 900 then goes to the database and looks in the VanApp table so as to display to the user the applications that were found on his/her computer-based device 1214 by redirecting to an active server page.

Load

Once the applications, which are installed on the user's computer-based device, are determined, and in an expert mode, particular applications and files are chosen, transfer of application settings, files and other data is performed. This comprises three parts, getting the load directive file, processing the load directive file on the client, and processing the LoadDirectiveOut file on the server.

Getting the Load Directive File

Figure 14:
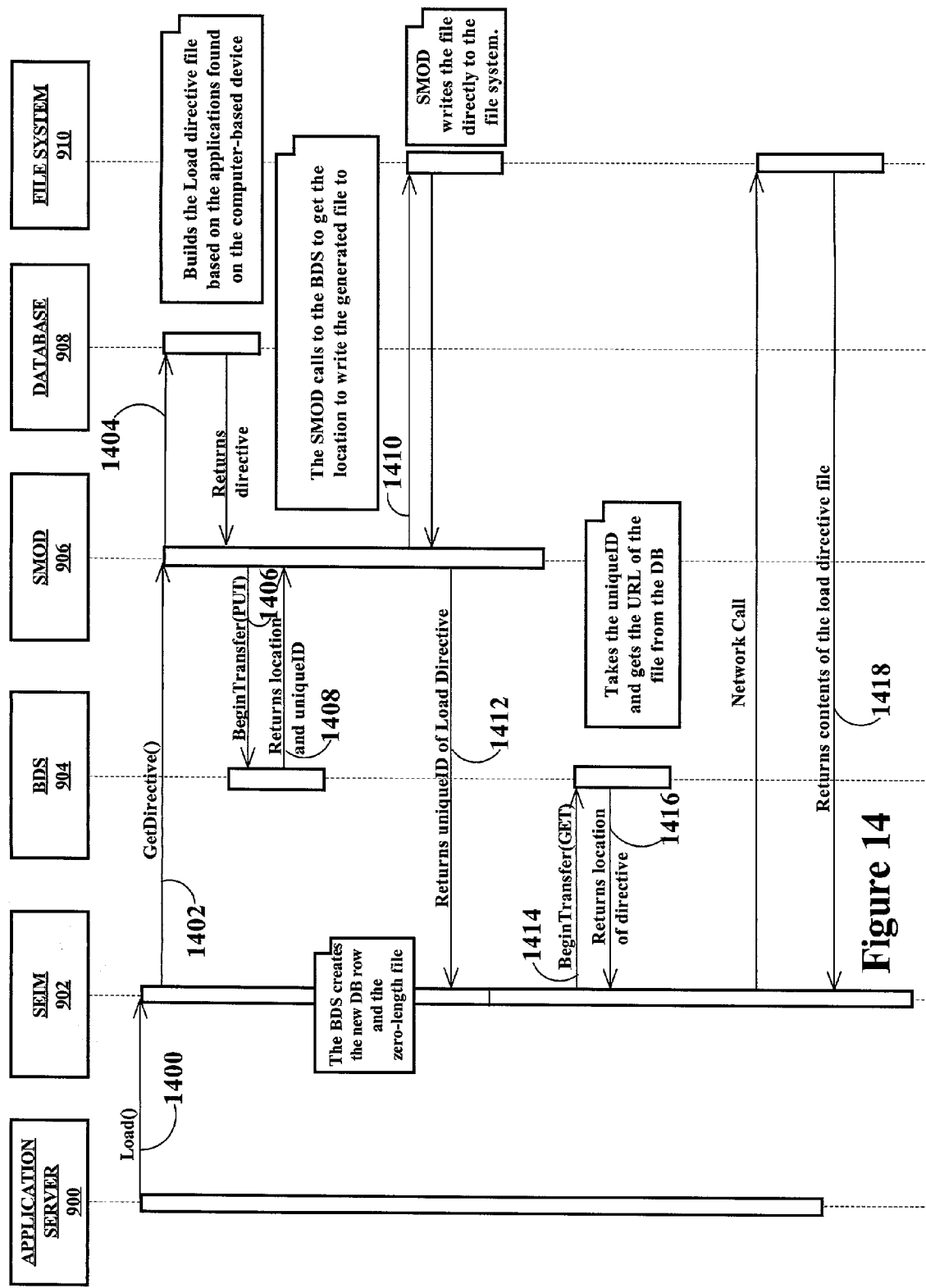
FIG. 14 illustrates the process of getting the load directive.

Like in Load Review, the process begins with getting the directive file from the server. This is illustrated in FIG. 14.

When the user indicates they want to transfer their settings, such as by clicking a button marked "load" on the web page, a JavaScript routine on the APPLICATION SERVER 900 calls a method 1400 on the SEIM 902, in this case, i.e., Load(). The SEIM 902 then calls GetDirective 1402 on SMOD 906. The goal of GetDirective is still to return the uniqueID of the directive file, but for load directives, SMOD 906 generates the load directive based on the applications that the user has on their computer-based device and what they have chosen to load 1404.

To build the file, SMOD 906 reads the VanApp table in database 908 and selects all of the PIDS of the applications that the user has on the computer-based device (in expert mode, only including those that were chosen to be loaded. These are the applications that have the IncludeInLoad flag set. After getting this list, the SMOD looks in a CDS snippet table to determine the XML load snippets that should be included in the Load directive file. FIG. 15 illustrates the schema of the CDS snippet table.

The snippet table holds XML directive snippets for review and load directives. Load directive snippets have a Load Type (41), and review directive snippets have a type of Review (38). Review Directive snippets are used to build the pre-built review directive files when BuildReviewDirectives is utilized by administrators of the system. The following is an example snippet for a load directive:

<PID>
30
<Description>
Excel 97
<StoreKeyValue>
HKCU\PSoftware\Microsoft\Office\B. o\Excel\microsoft Excel\s CmdBarData
<CID>36</CID>
</StoreKeyValue>
</Description>
</PID>

SMOD 906 gathers this snippet info for all selected applications and creates a directive file including all snippets plus some additional tags to denote the type and the version of the directive file.

When a user has manually selected a collection of files on their computer-based device for transfer, a special snippet, the MoveFiles snippet, is placed in the directive file as it is being created, and after it has been created, the directive it is then parsed and the MoveFiles snippet is replaced with the list of files that the user selected during the pre-load phase.

Once the directive has been created, SMOD 906 then makes the BeginTransfer call 1406 to BDS 904 to get the location 1408 of where to write the file. As in the case of LoadReview, this call to BDS 904 with the PUT flag set causes a row to be created in the catalog table of BDS 904 that cross-references the location with the file's uniqueId. In addition, the zero-length file gets created in the file system. Then, SMOD 906 writes the file 1410 directly to file system 910, i.e. there is no HTTP transfer taking place. SMOD 906 then returns the uniqueID of the file 1412 back to CAD 902.

As in the case of Load Review, the SEIM calls BeginTransfer 1414 on BDS 904 passing it in the uniqueID. This call returns with the location of the file to get 1416. The SEIM 902 in turn, performs a network call such as an HTTP GET of the file 1418.

Processing the Load Directive file on the Client

Once the SEIM 902 has the list of instructions on how to gather settings on the client's computer-based device, it begins storing the settings. Similar to the load review stage, the SEIM 902 creates a LoadDirectiveOut file to tell the server what settings to store.

Figure 16:
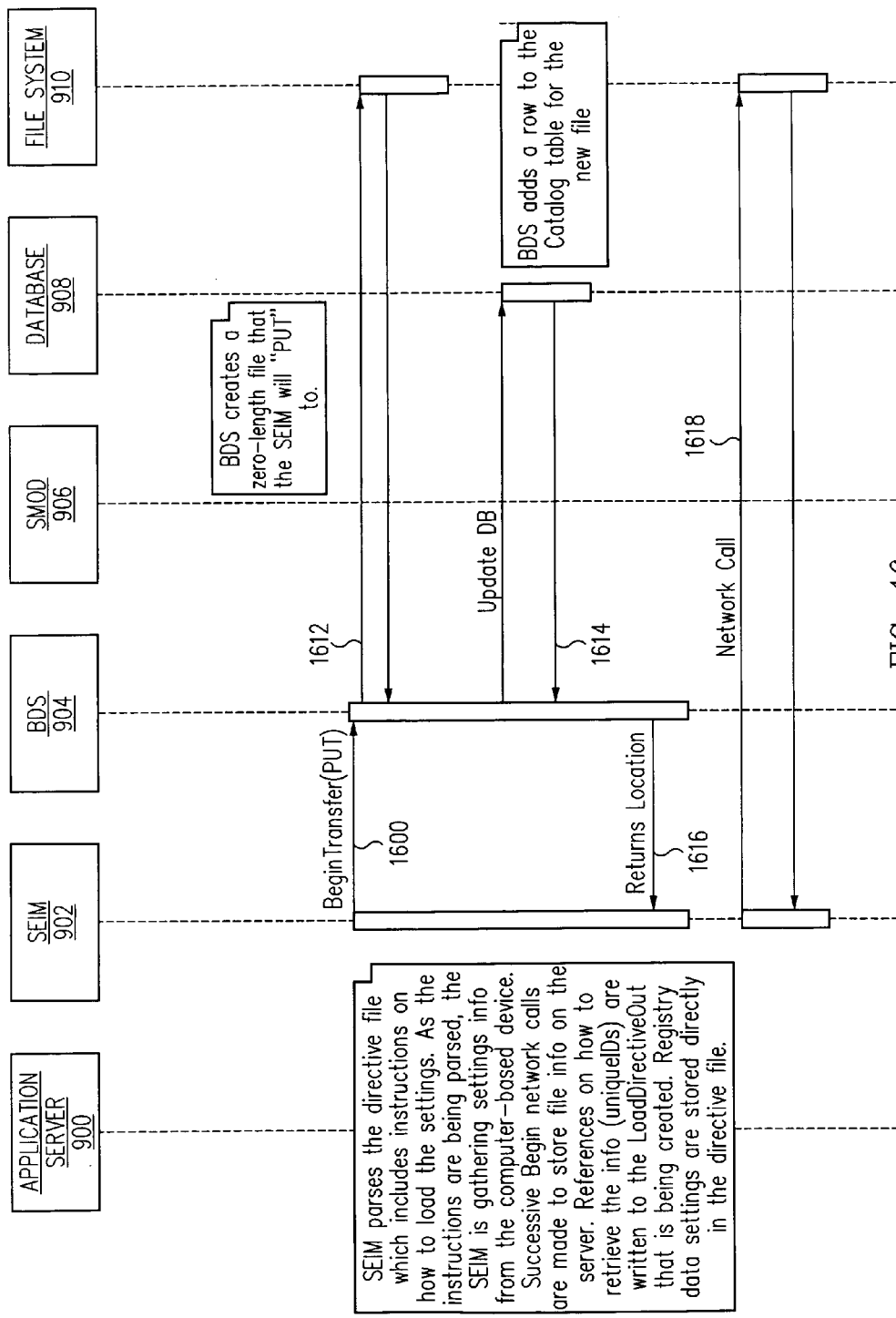
FIG. 16 illustrates the client processing of the load directive.

The SEIM 902 parses the load directive file, which includes instructions on how to gather settings, files, and other data. As it parses the instructions, the SEIM 902 gathers settings from the computer-based device. Successive network calls such as BeginTransfer/HTTP PUT calls, as will be explained below in conjunction with FIG. 16, are performed to store files on file system 910. UniqueIDs for files and settings are written to the LoadDirectiveOut file, as further detailed below.

Settings are basically divided into user files and registry settings. An exemplary part of a Load Directive to store registry settings looks like:

```
<StoreKey          Value>HKCU\Control          Panel
   Desktop\WallpaperStyle
<CID>14</CID>
</StoreKeyValue>
```
This instructs the SEIM 902 to store the value found for the registry key "HKCU\Control Panel\Desktop\WallpaperStyle." The SEIM 902 retrieves this value and writes it to the LoadDirectiveOut file snippet as follows:
```
<StoreKey                  Value>HKCU\Control
   Panel\Desktop\WallpaperStyle
<CID>14</CID>
<Value>2</Value>
<Value>REG_SZ</Value>
</StoreKeyValue>
```
The CID tag directs SMOD 906 as to what command in the command table this snippet corresponds to. Each CID is mapped to a unique command in the command table. As in example above, only the command "<StoreKeyValue>HKCU\Control Panel\Desktop\WallpaperStyle" has a CID of 14. The CID is used, as explained below, to speed processing during the generation of the unload directive file. The registry setting is represented as two pieces of data, the registry value and the type of registry data that it is. REG_SZ indicates that the value is a string (The other types are REG_DWORD and REG_BINARY). Both need to be saved to put the settings on the new computer-based device.

In some cases, the SEIM 902 needs to store file information on the server as in the following snippet:
```
<StoreFileAtValue>HKCU\Software
    Microsoft\WAB\WAB4\Wab File Name\
<CID>20</CID>
</StoreFileAtValue>
```
The StoreFileAtValue tags tells the SEIM 902 to look in the registry for the key, "HKCU\Software\Microsoft\WAB\WAB4\Wab File Name\", get the value of the fully qualified path of the file stored at that location and store that file on the server. The load directive out snippet generated for that command is:
```
<StoreFileAt            Value>HKCU\Software
    Microsoft\WAB\WAB4\Wab File Name\
<CID>20</CID>
<Value>80596</Value>
</StoreFileAtValue>
```
The 80596 is the uniqueID of the file that the SEIM stored on the server. The process to put the file and store the uniqueID is shown in FIG. 16.

Once the SEIM 902 gets the file location from the registry, it gathers the attributes from the file and passes this into BeginTransfer 1600 as illustrated by the following:
/actions/bds/Begin Transfer.asp?s VanID={DOAB4C61}-IBC3-1:LD4-9DB9-0000CO540132)&:sSessionID=19443788986
nPID=13&
sMode=PUT&
sFullPath=C:\WINNT\ProfileS\Taylor\Application
   W20Data\Microsoft\Address%20Book\\Taylor.wab&
nFlagsAndAttributes=32&
nCreationTimeLow=947677846&
nCreationTimeHigh=29274947&
nLastAccessTimeLow–1505512040&
nLastAccessTimeHigh=29343558&
nLastWriteTimeLow=451749727&
nLastWriteTimeHigh=29342591&
nSizeLow=117848&
nSizeHigh=0

BeginTransfer then creates the Catalog table entry 1614 as in Load Review, but this time the PID and file attributes are passed in and have meaning. The BDS also makes the zero-length file 1612 on file system 910.

The BeginTransfer, as in the other examples, returns the location 1616 of where to put the file and the uniqueId. An example of the return message is:
```
<HTML>
<HEAD>
<TITLE></TITLE>
</HEAD>
<BODY>
<fileid>80596</fileid>
<Uri>/actions//bds/data/(DOAB4C6D-IBC3-IID4-9DB9-
    OOOOCOS40132)-nfiuawtmtldkifr</ur
i>
<sResult>Success</sResult>
<sInfo>File    /actions/bds/data/(DOAB4C60-IBC3-IID4-
    9DB9-0000CO5401321-nfiuswtmtldkifr created.</sInfo>
</BODY>
</HTML>
```
After obtaining the location from the return message, the SEIM 902 performs a network call such as an HTTP PUT to transfer the file 1618 to file system 910 and stores the uniqueId for the file in the load directive out file as shown in the <StoreFileAtValue>snippet above.

For groups of files, as in the case of storing a user's favorites, the SEIM 902 gathers all of the files and compresses them. The attribute and local path information for the files are stored in the compressed file. The SEIM then follows the process in FIG. 19 to transfer the compressed file on file system 910. As in the single file case, the uniqueID of the compressed file is stored in the LoadDirectiveOut file.

Processing the Load Directive Out File on the Server

Figure 17:
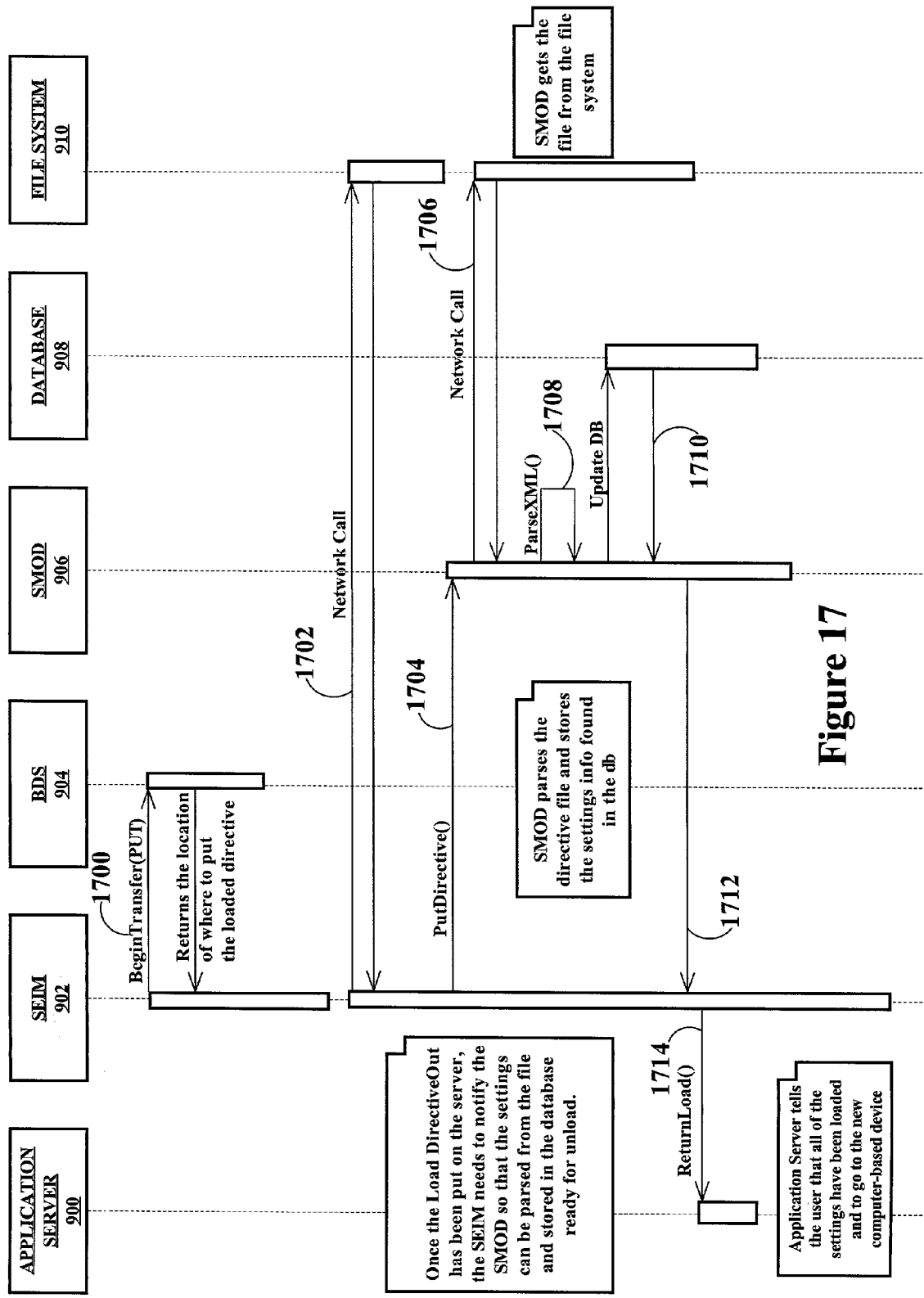
FIG. 17 illustrates the server processing of the load directive out file.

Once all of the settings have been gathered in the Load Directive Out file, the SEIM will put the directive on the server. The process is outlined in FIG. 17.

The SEIM 902 places the LoadDirectiveOut file on file system 910, utilizing network calls such as the BeginTransfer call and HTTP PUT, in the same manner as it placed the ReviewDirectiveOut file before. This is illustrated in FIG. 20 at 2000 and 2002.

After placing the LoadDirectiveOut file on file system 910, the SEIM 902 notifies SMOD 906 that the new directive file is on file system 910 through the PutDirective active server page call 1704, SMOD 906 then retrieves the LoadDirectiveOut file, by performing a network call such as an HTTP GET 1706, from file system 910.

SMOD 906 parses 1708 through the file to store the setting information into the database 1710. This information is stored in the UDS in the Setting table. FIG. 18 illustrates the schema of the setting table.

Each setting will have its own row in the Setting table. The VanID, CID, and Data are mapped directly from the directive file (the VanID is passed in the call to PutDirective). The SequenceNumber is the order that the Settings were found in the file within a CID. This is in case the settings need to be unloaded in a particular order.

Once all of the settings have been stored in the database, the PutDirective call will return success 1712 to the SEIM 902. The SEIM 902 then returns from the Load 1714, i.e., returns back to the application server 900. The application server 900 then informs the user via a web page that all of the settings have been moved, and they can go to their new computer-based device to unload the settings.

Likewise, the process for transferring settings to a computer-based device takes place in two stages. The Unload Review stage gathers information about the user's new computer-based device. The Unload stage is responsible for moving settings from the server to the new or target computer-based device.

For transferring settings to the second computer-based device, in one embodiment, the user interacts with some additional web pages and eventually be told to visit the website from their new computer-based device. On the new device, after passing through the same general auto install process just described above, they would get to the point where the could click an "UnLoad" button. This would trigger the JavaScript which invokes an "UnLoad Settings" method on the SEIM (now located on the new computer-based device). The client would make a network call such as a HTTP call to request where it should find the directive file that holds the user's settings. It would then make a network call such as an HTTP GET call to retrieve the appropriate corresponding directive file to the new computer. Once downloaded, it would decode the directive file and follow the instructions to install the user's settings. In most cases, when done, the user will re-boot and their settings will then take affect. An option to undo the load is also given.

Specifically, as explained following, this overall process is performed in five parts, three parts during the unload review stage and two parts during the unload stage.

Unload Review

The unload review process is essentially the same as the load review process. As such, only a brief discussion of the unload process will be given with relation to FIGS. 12, 14 and 15. Like the load review process, the system interaction for this stage comprises 3 parts: Getting the unload review directive file, Client processing of the unload review directive file, and Server processing of the unload review directive file.

One difference occurs when the SMOD is processing the unload review directive out file. When the rows for the applications that were found are put in the VanApp table, the TypeID is set to a 1 instead of a 0 as in the case for Load Review.

Getting the Unload Review Directive File

The steps of the getting the unload review directive file part is the same as that of the corresponding getting the load review directive file part of the load review stage, except, in the cases where transference of settings are between an old computer-based device and a new computer-based device, it is possible that the user may be unloading settings on a computer-based device with a different operating system, hardware or other system parameters. Therefore, the review directive file that the SEIM gets from the server may be different and therefore looking for different applications.

During the discussion, the unload review directive file is distinguished in this process from the load review directive, however, it should be understood that, in the preferred embodiment, only one set of review directives is maintained at the server side. The use of the term unload or load review directive is used to distinguish between the phases in which a review directive is used and the possibility that a different review directive is used in each phase as the operating systems of different computer-based devices may differ. For retrieval of the unload review directive file, the application server 900 downloads the SEIM 902 (if not already present) and makes the UnLoadReview call 912 to it. The UnLoa-dReview call causes the SEIM 902 to follow the automated steps of retrieving the unload review directive. First, the SEIM 902 performs a GetDirective call to SMOD 906 to get the unload review directive file 914.

SMOD 906 retrieves a uniqueid 916, 918 of the review directive built for the particular operating system of the new computer-based device from database 908. In particular, this information is retrieved from the content database. SMOD 906 then returns the uniqueId 920 of the review directive file back to the SEIM 902.

The SEIM 902 makes a BeginTransfer call passing the uniqueID to BDS 122. BDS then returns the location 924 of the unload review directive file to the SEIM 902.

Having obtained the location for the unload review directive file, the SEIM 902 performs a network call such as an HTTP GET transfer 926 which returns the contents of the review directive file 928.

Processing the Unload Review Directive on the Client

Having retrieved the unload review directive file, the SEIM 902 follows the instructions of this file to determine the applications that are installed on the computer-based device.

As shown in FIG. 14, once the SEIM 902 has parsed and processed the unload review directive file, the created ReviewDirectiveOut file needs to be put on the server. To do this, the SEIM 902 performs a BeginTransfer call to BDS 904, to notify the BDS 904 that a file needs to be put in file system 910.

This causes BDS 904 to create a zero-length file 1102 on file system 910 that the SEIM 902 can transfer the ReviewDirectiveOut file to. Then BDS 904 adds a row to the catalog table in the database 1104 with the file attribute and location information. The PID in this case is −1, as review files are not associated with a particular product. Also, the attribute information is blank as this file will not be transferred back to a computer-based device. The call returns with a result telling the SEIM 902 where to transfer the file.

After obtaining this response, the SEIM 902 performs a network call such as an HTTP PUT, transferring the ReviewDirectiveOut file to file system 910.

Processing the Unload Review Directive Out on the Server

Once 902 has determined the applications that are installed on the client computer-based device, and put the results on file system 910, the ReviewDirectiveOut file is processed.

Referring to FIG. 15, the SEIM 902 notifies SMOD 906 that there is a directive file ready to be parsed by making the PutDirective call 1200. SMOD 906, in turn, resolves the uniqueID to a file location 1202 on file system 910 via BDS 904 and gets the file through a network call such as an HTTP GET 1204. SMOD 906 then parses the file 1206 and stores the applications that were found in the database in the VanApp table 1208.

For every application that is found on the user computer-based device, one row is put into the VanApp table. This information is used later when the unload directive file is built. However, when the rows for the applications are put in the VanApp table for the unload review directive, the TypeID is set to a 1 instead of a 0 as in the case for Load Review. In an expert mode, the IncludeInLoad and IncludeInUnload columns are modified based on the results of the user's selections. Once this is complete, PutDirective returns back 1210 to the SEIM 902, which returns back 1212 to the APPLICATION SERVER 900 to signal the end of the UnLoadReview call.

The APPLICATION SERVER 900 then goes to the database and looks in the VanApp table so as to display to the user the applications that were found on his/her computer-based device 1214 by redirecting to an active server page.

Unload

As in the unload review stage, the unload is essentially the same as the load stage, however, in one embodiment, it only has two parts rather than three. The following will be a brief description on the unload stage, denoting the differences between the unload and load stage, with regards to FIGS. 14, 19 and 20.

Getting the Unload Directive File

When the user indicates they want to transfer their settings, such as by clicking a button marked "unload" on the web page, a JavaScript routine on the APPLICATION SERVER 900 calls a method 1400 on the SEIM 902, in this case, i.e., Unload(). The SEIM 902 then calls GetDirective 1402 on SMOD 906. The goal of GetDirective is still to return the uniqueID of the directive file, but for unload directives, SMOD 906 generates the unload directive.

The set of applications to include in the unload directive file is based on the applications that the user chooses to unload from the old computer-based device and the applications the user has installed on the new computer-based device. The latter list comes from unload review and lives in the VanApp table. As in the Load stage, SMOD 906 then builds up the snippets from the snippet table (with type 41) for all of these applications into a file. Then, SMOD 906 parses through this file and replaces the <CID>n</CID> entries with the values from the first computer-based device. These values were stored in the setting table. The result is a file that looks very similar to the Load Directive Out file.

Figure 19:
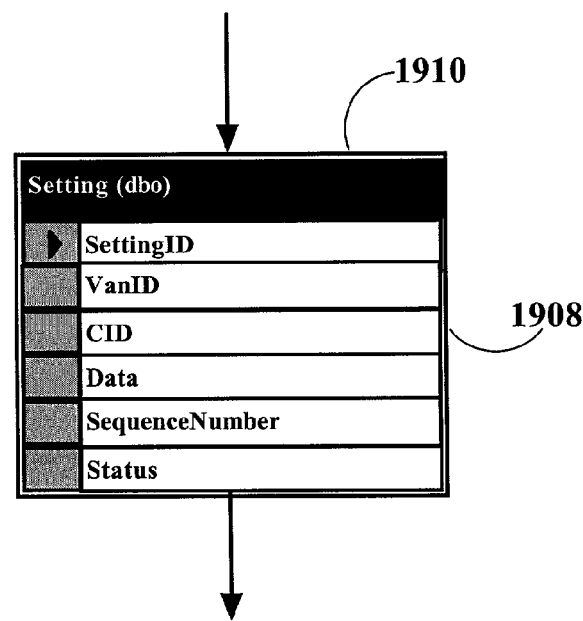
FIG. 19 illustrates the parsing and use of CIDs to retrieve values in settings table.

To further illustrate the construction of the unload directive file, FIG. 19 illustrates the parsing and use of CIDs to retrieve values in the setting table. A snippet from snippet table is illustrated at 1900. When SMOD 906 parses through the snippet file, it encounters CID 1906. SMOD 906 uses CID 1906, in this case 20, to look into setting table 1910. As previously described, each CID corresponds to a particular command, and is used to locate the particular data retrieved from that command in the setting table. Therefore, when SMOD 906 matches CID 1906 with CID 1908 in the particular VanID of interest, SMOD retrieves the stored data which was transferred from the first computer-based device in response to the command. SMOD then inserts the data into the snippet, as shown at 1902. In the particular example of FIG. 19, SMOD matches a CID 1906 of 20 to 20 in the setting table 1908, retrieves "<Value>80596</Value>" and inserts it into the snippet 1904. By doing this for all snippets, the unload directive file is generated.

Once the directive has been created, SMOD 906 then makes the BeginTransfer call 1406 to BDS 904 to get the location 1408 of where to write the file. As in the case of LoadReview, this call to BDS 904 with the PUT flag set causes a row to be created in the catalog table of BDS 904 that cross-references the location with the file's uniqueID. In addition, the zero-length file gets created in the file system. Then, SMOD 906 writes the file 1410 directly to file system 910, i.e. there is no HTTP transfer taking place. SMOD 906 then returns the uniqueId of the file 1412 back to the SEIM 902.

As in the case of Load Review, the SEIM calls Begin-Transfer 1414 on BDS 904 passing it in the uniqueID.). This call returns with the location of the file to get 1416. The SEIM 902 in turn, executes a network call, such as an HTTP GET, to obtain the file 1418.

Client processing of the Unload Directive File

The SEIM 902 parses the unload directive file which includes instructions on how to place on the new computer-based device the previously retrieved settings, files, and other data. As it parses the instructions, the SEIM 902 it places the settings onto the computer-based device. Successive network calls such as BeginTransfer/HTTP GET calls, as will be explained below in conjunction with FIG. 14, are performed to retrieve files on file system 910 and place them on the new computer-based device.

Once the client has all of the instructions for unloading, it begins processing the file in much the same way that the load directive was parsed. One difference is that instead of gathering settings from the registry and storing them in the directive out file, the SEIM 902 is parsing the settings from the unload directive file and storing them in the new computer-based device's registry.

An exemplary part of a unload directive to store registry settings looks like:

<StoreKey Value>HKCU\Control Panel\desktop\WallpaperStyle
<CID>14</CID>
<Value>2</Value>
<Value>REG_SZ</Value>
</StoreKeyValue>

This instructs the SEIM 902 to store the value found for the registry key "HKCU\Control Panel\Desktop\WallpaperStyle." The SEIM 902 retrieves this value and places it registry key of the new computer-based device.

For files, the process is much the same as described in the section, "Processing the Load Directive file on the Client" and in FIG. 19. In Load, the SEIM 902 calls BeginTransfer on BDS 904 to get the location and uniqueID. It then uses the location to put the user file on file system 910 and writes the uniqueID to the load directive out file. Here, the process is reversed. The SEIM 902 gets the uniqueId from the unload directive as in the snippet below.

<StoreFileAtValue>HKCU\Software\Microsoft\WAB\WAB4\Wab
  File Name\
<CID>20</CID>
<Value>80618</Value>
</StoreFileAtValue>

Then the SEIM 902 calls BeginTransfer(GET) 2000 passing in the uniqueID as shown below.
/actions/bds/BeginTransfer.asp?s VanID=@DOAB4C6D-
   IBC3-IID4-9DB9-0000CO540132)&
sSessionID=1519609423&
sMode=GET&
n UniqueID=80618

The response 2002 from this would list all of the attributes, the location where to put the file on the client computer-based device, and the location of the file location on the server side. The timestamps are displayed as signed integers to conform to the way the database stores them.

An example response would be:
<HTML>
21 HEAD>
<TITLE></TITLE>
</HEAD>
<BODY>
<pid>13</pid>
<pathname>C:\WINNT\ProfileS\Taylor\Application
   Data\microsoft\Address
   Book\Taylar.wab</pathname>
<flags>32</flags>
<creationhi>29274947</creationhi>

```
<creationlo>29343558</creationlo>
<lastaccesshi>29343558</lastaccesshi>
<lastaccesslo>1505512040</lastaccesslo>
<lastwritehi>29342sgi</lastwritehi>
<lastwritelo>-451749727</lastwritelo>
<filesizeh i>0</filesizehi>
<filesizelo>117848</filesizelo>
<uri>/actionslbds/data/(DOAB4CGD-IBC3-IID4-SDB9-
    0000CO540132)-nfiuswtmtldkifr</uri>
<sResult>success</sResult>
<sInfo>File exists at /actions/bds/data/(DOA34C6D-IBC3-
    IID4-9DB9-0000CO540132)-nfiusw tmtldkifr.</sInfo>
</BODY>
</HTML>
```

The SEIM 902 then uses the location to get the data file through a network call such as an HTTP GET transfer 2004, put it in the correct place on the user's new computer-based device and restore all of its attributes.

Once the SEIM 902 has unloaded all of the user's file and registry settings, it returns back 2006 to the application server 900 from the call to Unload(). The APPLICATION SERVER 900 then tells the user that all of the settings have been moved, and that they may have to reboot their system.

It is to be appreciated that essentially all of the components of the server system will be comprised of multiple software applications, multiple hardware components and potentially multiple hosting locations as is conventionally done in the industry for network site operation.

CONCLUSION

A system and method has been shown in the above embodiments for the effective implementation of a method and system for server based extraction, transfer, storage and processing of remote settings, files and data. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment, or specific computing hardware.

The above enhancements for the method and system associated with the server activity during the process of transfer of files, application settings, and other data and its described functional elements are implemented in various computing environments. For example, the present invention may be implemented on a conventional IBM PC or equivalent, multi-nodal system (e.g. LAN) or network (e.g. Internet, WWW, wireless web). All programming, GuIs, display panels and dialog box templates, and data related thereto are stored in computer memory, static or dynamic, and may be retrieved by the user in any of: conventional computer storage, display (i.e. CRT) and/or hardcopy (i.e. printed) formats. The programming of the present invention may be implemented by one of skill in the art of object-oriented or database programming. In addition, the methodology and architecture of the present invention is equally applicable, and the appropriate modifications are easily performed by one of skill in the art, to an embodiment in which pre-generated profiles are created and transferred to the end computer-based device.

The invention claimed is:

1. A method for remotely extracting and storing computer related information across a network, said method comprising:

a) establishing a communications link between at least one computer-based device and a remote server system;

b) downloading a software module from said remote server system to said computer-based device;

c) transferring a first directive file from said remote server system to said software module, said first directive file working in conjunction with said remote server system, said software module identifying installed computer related information on said computer-based device;

d) said remote server system receiving a second directive file from said software module regarding said identified installed computer related information;

e) receiving from said software module a selected list of installed computer related information to be uploaded to said remote server system;

f) transferring a third directive file from said remote server system to said software module, said third directive file working in conjunction with said remote server system and said software module extracting said selected list of installed computer-related information;

g) said remote server system receiving said extracted information from said software module in a fourth directive file, and h) said remote server system parsing said fourth directive file and storing said extracted information.

2. The method for remotely extracting and storing computer related information across a network, as per claim 1, wherein one or more of said directive files are created from an XML snippet database.

3. The method for remotely extracting and storing computer related information across a network, as per claim 2, wherein said XML snippet database is periodically updated to include new and updated operating systems.

4. The method for remotely extracting and storing computer related information across a network, as per claim 3, wherein said transferring a first directive file from said remote server system to said software module further comprises:

identifying an operating system associated with said computer-based device;

said remote server system accessing said XML snippet database to identify XML snippets associated with said identified operating system, and adding said identified XML snippets to said first directive file.

5. The method for remotely extracting and storing computer related information across a network, as per claim 3, wherein said transferring a third directive file from said remote server system further comprises:

accessing said XML snippet database with said remote server system to identify XML snippets associated with said selected list of information, corresponding to identified installed applications, files, and other data, to be uploaded to said remote server system, and adding said identified snippets to said third directive file.

6. The method for remotely extracting and storing computer related information across a network, as per claim 1, wherein said information comprises any of the following: hardware settings, system settings, attached device settings, application settings, document settings, desktop settings, e-mail settings, and address book settings.

7. The method for remotely extracting and storing computer related information across a network, as per claim 1, wherein said information comprises any from the following list: hardware settings, system settings, attached device settings, application settings, document settings, files, desktop settings, files, data, e-mail settings, address book settings, bookmarks, and cookies.

8. The method for remotely extracting and storing computer related information across a network, as per claim 1, wherein said computer-based devices include any of the following: personal computer systems, laptops, portable computers, net devices, palm computers or telephones.

9. The method for remotely extracting and storing computer related information across a network, as per claim 1, wherein said parsing of directive files is performed by an XML parser.

10. The method for remotely extracting and storing computer related information across a network, as per claim 1, wherein said directive files and said stored information are in a markup based format.

11. The method for remotely extracting and storing computer related information across a network, as per claim 10, wherein said markup format is any of the following formats: HTML, SGML, XML or WML.

12. The method for remotely extracting and storing computer related information across a network, as per claim 1, wherein said remote server system is located within an enterprise server system.

13. A system for remotely extracting and storing computer related information across a network, said system comprising:
   at least one computer-based device connected to a remote server system through said network;
   a software module downloaded from said remote server system to said computer-based device;
   a markup based snippet database comprising application and operating system related information, said snippet database accessible by said remote server system;
   a first directive file from said remote server system identifying installed applications in said computer-based device, said first directive file created by said remote server system by selective retrieval of snippets from said markup based snippet database;
   a second directive file, received by said remote server system from said software module, comprising information regarding a list of selected information corresponding to identified installed applications;
   a third directive file from said remote server system providing instructions for extracting said selected information, said third directive file created by said remote server system by selective retrieval of snippets from said markup based snippet database, and
   said remote server system receiving and storing said extracted information.

14. The system for remotely extracting and storing computer related information across a network, as per claim 13, wherein said information comprises any from the following list: hardware settings, system settings, attached device settings, application settings, document settings, desktop settings, e-mail settings, and address book settings.

15. The system for remotely extracting and storing computer related information across a network, as per claim 13, wherein said information comprises any from the following list: hardware settings, system settings, attached device settings, application settings, document settings, files, desktop settings, files, data, e-mail settings, address book settings, bookmarks, and cookies.

16. The system for remotely extracting and storing computer related information across a network, as per claim 13, wherein said computer-based devices include any of the following: personal computer systems, laptops, portable computers, net devices, palm computers or telephones.

17. The system for remotely extracting and storing computer related information across a network, as per claim 13, wherein said stored information and directive files are in a markup based format.

18. The system for remotely extracting and storing computer related information across a network, as per claim 17, wherein said markup based format includes any of the following languages: HTML, SGML, WML or XML.

19. The system for remotely extracting and storing computer related information across a network, as per claim 18, wherein said system further includes an XML parser for parsing directive files in XML format.

20. The system for remotely extracting and storing computer related information across a network, as per claim 13, wherein said network comprises any of the following: local area network (LAN), wide area network (WAN), Internet, HTTP-based network, wireless network or enterprise network.

21. The system for remotely extracting and storing computer related information across a network, as per claim 13, wherein said snippet database is an XML snippet database.

22. The system for remotely extracting and storing computer related information across a network, as per claim 21, wherein said XML snippet database is periodically updated to include new and updated applications.

23. A system for remotely extracting and storing computer related information across a network, said system comprising:
   at least one computer-based device connected to a remote server system through said network;
   a software module downloaded from said remote server system to said computer-based device;
   an XML snippet database comprising application and operating system related information, said XML snippet database accessible by said remote server system;
   one or more directive files created by said remote server system by selective retrieval from said XML snippet database, said one or more directive files transferred to said software module and identifying information to be transferred from said computer-based device, and
   one or more directive out files received and stored by said remote server system from said software module, said directive out files comprising said identified information.

24. The system for remotely extracting and storing computer related information across a network, as per claim 23, wherein said information comprises any from the following list: hardware settings, system settings, attached device settings, application settings, document settings, desktop settings, e-mail settings, and address book settings.

25. The system for remotely extracting and storing computer related information across a network, as per claim 23, wherein said information comprises any from the following list: hardware settings, system settings, attached device settings, application settings, document settings, files, desktop settings, files, data, e-mail settings, address book settings, bookmarks, and cookies.

26. The system for remotely extracting and storing computer related information across a network, as per claim 23, wherein said computer-based devices include any of the following: personal computer systems, laptops, portable computers, net devices, palm computers or telephones.

27. The system for remotely extracting and storing computer related information across a network, as per claim 23, wherein said directive files and stored information are in an XML format.

28. The system for remotely extracting and storing computer related information across a network, as per claim 27, wherein said system further includes an XML parser for parsing directive files in XML format.

29. The system for remotely extracting and storing computer related information across a network, as per claim 23, wherein said network comprises any of the following: local area network (LAN), wide area network (WAN), Internet, HTTP-based network, wireless network or enterprise network.

30. The system for remotely extracting and storing computer related information across a network, as per claim 23, wherein said XML snippet database is periodically updated to include new and updated applications.

* * * * *